US010972205B2

(12) United States Patent
Yamagishi

(10) Patent No.: US 10,972,205 B2
(45) Date of Patent: Apr. 6, 2021

(54) RECEPTION APPARATUS, TRANSMISSION APPARATUS, AND DATA PROCESSING METHOD

(71) Applicant: Saturn Licensing LLC, New York, NY (US)

(72) Inventor: Yasuaki Yamagishi, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 16/331,225

(22) PCT Filed: Oct. 6, 2017

(86) PCT No.: PCT/JP2017/036456
§ 371 (c)(1),
(2) Date: Mar. 7, 2019

(87) PCT Pub. No.: WO2018/074265
PCT Pub. Date: Apr. 26, 2018

(65) Prior Publication Data
US 2019/0280793 A1 Sep. 12, 2019

(30) Foreign Application Priority Data

Oct. 21, 2016 (JP) .............................. JP2016-207225

(51) Int. Cl.
*H04N 5/445* (2011.01)
*H04H 60/46* (2008.01)
(Continued)

(52) U.S. Cl.
CPC ............ *H04H 60/46* (2013.01); *H04H 20/28* (2013.01); *H04H 20/93* (2013.01); *H04H 60/82* (2013.01);
(Continued)

(58) Field of Classification Search
CPC ............... H04N 21/475; H04N 21/435; H04N 21/4755; H04N 21/235; H04N 21/64322;
(Continued)

(56) References Cited

U.S. PATENT DOCUMENTS 5,498,003 A * 3/1996 Gechter .................. A63F 13/52
463/1
5,715,416 A * 2/1998 Baker ..................... G06F 16/10
715/839
(Continued)

FOREIGN PATENT DOCUMENTS

CN  104737547 A   6/2015
CN  103069826 B   10/2016
(Continued)

OTHER PUBLICATIONS

Extended European Search Report dated Jun. 24, 2019 in Patent Application No. 17861341.0, 10 pages.
(Continued)

*Primary Examiner* — Michael B. Pierorazio
(74) *Attorney, Agent, or Firm* — Oblon, McClelland, Maier & Neustadt, L.L.P.

(57) ABSTRACT

The present technology relates to a reception apparatus, a transmission apparatus, and a data processing method capable of providing content according to preferences of an end user. The reception apparatus provides content according to the preferences of an end user by processing question information, which indicates a question about the preferences of the end user and is delivered together with content, on the basis of at least one of delivery information indicating that a service for providing dynamic metadata expressing the preferences of the end user is delivered or reference information indicating a reference destination of an application for generating first answer information indicating an answer set by the end user for the question about the preferences of
(Continued)

the end user. The present technology can be applied to, for example, a television receiver.

20 Claims, 36 Drawing Sheets

(51) Int. Cl.
| | |
|---|---|
| H04H 20/93 | (2008.01) |
| H04H 60/82 | (2008.01) |
| H04N 21/235 | (2011.01) |
| H04N 21/475 | (2011.01) |
| H04N 21/435 | (2011.01) |
| H04H 20/28 | (2008.01) |

(52) U.S. Cl.
CPC ......... *H04N 21/235* (2013.01); *H04N 21/435* (2013.01); *H04N 21/475* (2013.01); *H04N 21/4755* (2013.01)

(58) Field of Classification Search
CPC ............. H04N 21/4758; H04N 21/454; H04N 21/4532; H04N 21/4381
USPC ........................................................ 725/46
See application file for complete search history.

(56) References Cited

U.S. PATENT DOCUMENTS

| | | | | | |
|---|---|---|---|---|---|
| 5,838,314 | A | * | 11/1998 | Neel | H04N 7/17318 725/8 |
| 5,872,575 | A | * | 2/1999 | Segal | G06T 15/00 345/473 |
| 6,057,872 | A | * | 5/2000 | Candelore | H04N 7/17318 725/23 |
| 6,097,393 | A | * | 8/2000 | Prouty, IV | G06F 3/04815 345/419 |
| 6,409,602 | B1 | * | 6/2002 | Wiltshire | A63F 3/081 463/16 |
| 6,766,524 | B1 | * | 7/2004 | Matheny | G06Q 30/0226 348/E7.07 |
| 7,000,242 | B1 | * | 2/2006 | Haber | G06Q 30/02 725/43 |
| 7,054,831 | B2 | * | 5/2006 | Koenig | G06Q 30/02 463/1 |
| 7,071,041 | B2 | * | 7/2006 | Yamazaki | H01L 27/127 438/166 |
| 7,162,197 | B2 | * | 1/2007 | Kitamura | A63H 33/38 434/317 |
| 7,715,642 | B1 | * | 5/2010 | Collins | G06T 13/00 345/629 |
| 8,043,156 | B2 | * | 10/2011 | Ackley | A63F 13/12 463/23 |
| 8,090,799 | B2 | * | 1/2012 | Keeler | G06Q 30/0241 705/14.4 |
| 8,221,220 | B2 | * | 7/2012 | Ackley | A63F 13/332 463/23 |
| 8,271,575 | B2 | * | 9/2012 | Hunter | H04L 12/66 370/351 |
| 8,291,453 | B2 | * | 10/2012 | Boortz | H04N 7/17327 725/42 |
| 8,424,034 | B2 | * | 4/2013 | Bokor | G11B 15/023 725/32 |
| 8,429,015 | B2 | * | 4/2013 | Do | G06Q 30/0277 705/14.55 |
| 2001/0001160 | A1 | * | 5/2001 | Shoff | H04N 5/44543 725/51 |
| 2001/0037303 | A1 | * | 11/2001 | Mizrahi | G06Q 20/123 705/52 |
| 2001/0039571 | A1 | * | 11/2001 | Atkinson | H04N 21/26258 709/217 |
| 2002/0033844 | A1 | * | 3/2002 | Levy | G06F 21/10 715/744 |
| 2002/0052746 | A1 | * | 5/2002 | Handelman | H04N 7/163 704/270 |
| 2002/0069405 | A1 | * | 6/2002 | Chapin | H04N 7/162 725/32 |
| 2003/0056212 | A1 | * | 3/2003 | Siegel | H04N 5/913 725/31 |
| 2003/0149618 | A1 | * | 8/2003 | Sender | G06Q 30/02 705/14.55 |
| 2003/0149975 | A1 | * | 8/2003 | Eldering | H04N 7/17318 725/34 |
| 2003/0192060 | A1 | * | 10/2003 | Levy | H04N 5/783 725/133 |
| 2003/0217210 | A1 | * | 11/2003 | Carau, Sr. | G06F 1/26 710/302 |
| 2004/0068536 | A1 | * | 4/2004 | Demers | H04L 29/06027 709/201 |
| 2004/0255322 | A1 | * | 12/2004 | Meadows | H04N 7/17309 725/23 |
| 2005/0010951 | A1 | | 1/2005 | Saito et al. | |
| 2005/0108751 | A1 | * | 5/2005 | Dacosta | G06F 3/0482 725/39 |
| 2005/0132398 | A1 | * | 6/2005 | Baran | G06Q 30/02 725/28 |
| 2005/0144024 | A1 | * | 6/2005 | Wojton | G06Q 10/10 705/319 |
| 2005/0267813 | A1 | * | 12/2005 | Monday | G06Q 30/02 705/26.1 |
| 2006/0015925 | A1 | * | 1/2006 | Logan | H04N 7/163 725/135 |
| 2006/0123451 | A1 | * | 6/2006 | Preisman | H04N 7/17318 725/86 |
| 2006/0184579 | A1 | * | 8/2006 | Mills | H04N 7/173 |
| 2006/0291483 | A1 | * | 12/2006 | Sela | H04L 12/66 370/401 |
| 2007/0106557 | A1 | * | 5/2007 | Varghese | G06Q 30/0273 705/14.19 |
| 2008/0015864 | A1 | * | 1/2008 | Ross | G10L 15/1822 704/275 |
| 2008/0066098 | A1 | * | 3/2008 | Witteman | H04H 60/375 725/34 |
| 2008/0089659 | A1 | * | 4/2008 | Clapper | H04N 21/858 386/353 |
| 2008/0115161 | A1 | * | 5/2008 | Kurzion | G06Q 30/02 725/32 |
| 2008/0115655 | A1 | * | 5/2008 | Weng | G10H 1/0008 84/609 |
| 2008/0134229 | A1 | * | 6/2008 | Conant | H04N 7/17318 725/23 |
| 2008/0187279 | A1 | * | 8/2008 | Gilley | G06Q 30/02 386/250 |
| 2008/0221986 | A1 | * | 9/2008 | Soicher | G06Q 30/02 705/14.36 |
| 2008/0282283 | A1 | * | 11/2008 | Hilton | G06Q 20/12 725/5 |
| 2008/0295129 | A1 | * | 11/2008 | Laut | H04N 21/812 725/34 |
| 2009/0217316 | A1 | * | 8/2009 | Gupta | G06Q 30/0269 725/32 |
| 2009/0281908 | A1 | * | 11/2009 | Wong | G11B 27/034 705/26.1 |
| 2009/0299752 | A1 | * | 12/2009 | Rodriguez | D06F 58/30 704/275 |
| 2010/0131385 | A1 | * | 5/2010 | Harrang | G06Q 30/00 705/26.1 |
| 2010/0162289 | A1 | * | 6/2010 | Sanders | H04N 21/4758 725/23 |
| 2010/0256561 | A1 | * | 10/2010 | Gillespie, Jr. | A61M 5/142 604/151 |
| 2010/0283741 | A1 | * | 11/2010 | Heintze | G06F 3/0238 345/173 |
| 2010/0332570 | A1 | * | 12/2010 | Roberts | H04N 21/252 707/912 |
| 2011/0137753 | A1 | * | 6/2011 | Moehrle | H04N 21/2547 705/27.1 |
| 2011/0138326 | A1 | * | 6/2011 | Roberts | H04N 21/84 715/808 |

(56) References Cited

U.S. PATENT DOCUMENTS

| | | | |
|---|---|---|---|
| 2011/0246488 A1 | 10/2011 | Eyer | |
| 2011/0276334 A1* | 11/2011 | Wang | G10L 25/48 |
| | | | 704/270 |
| 2011/0310580 A1* | 12/2011 | Leung | G06F 1/1618 |
| | | | 361/807 |
| 2012/0016678 A1* | 1/2012 | Gruber | G06F 40/40 |
| | | | 704/275 |
| 2012/0054214 A1 | 3/2012 | Yamagishi et al. | |
| 2012/0084811 A1* | 4/2012 | Thompson | H04N 21/44222 |
| | | | 725/34 |
| 2012/0110620 A1* | 5/2012 | Kilar | G06Q 30/02 |
| | | | 725/34 |
| 2013/0205327 A1 | 8/2013 | Eyer | |
| 2014/0068646 A1 | 3/2014 | Oh et al. | |
| 2014/0068686 A1 | 3/2014 | Oh et al. | |
| 2014/0196070 A1* | 7/2014 | Moskowitz | H04N 21/8456 |
| | | | 725/19 |
| 2014/0259043 A1* | 9/2014 | Hunter | H04N 21/4784 |
| | | | 725/23 |
| 2015/0365725 A1* | 12/2015 | Belyaev | H04N 21/458 |
| | | | 725/46 |
| 2017/0195696 A1 | 7/2017 | Yamagishi et al. | |
| 2017/0303004 A1 | 10/2017 | Eyer | |

FOREIGN PATENT DOCUMENTS

| | | |
|---|---|---|
| CN | 105850141 B | 8/2019 |
| CN | 105981393 | 8/2019 |
| JP | 2015-530800 A | 10/2015 |
| WO | WO 2012/029569 A1 | 3/2012 |
| WO | WO 2014/035130 A1 | 3/2014 |
| WO | WO 2015/194392 A1 | 12/2015 |

OTHER PUBLICATIONS

"ATSC Standard: Interactive Services Standard A/105" Advanced Television Systems Committee, http://www.atsc.org/wp-content/uploads/2015/11/A105-2015.pdf, XP055383266, 2015, 136 pages.

Shani, G. et al. "Establishing User Profiles in the MediaScout Recommender System" 2007 IEEE Symposium on Computational Intelligence and Data Mining, XP031095478, 2007, 8 pages.

International Search Report dated Jan. 9, 2018 in PCT/JP2017/036456 filed on Oct. 6, 2017.

* cited by examiner

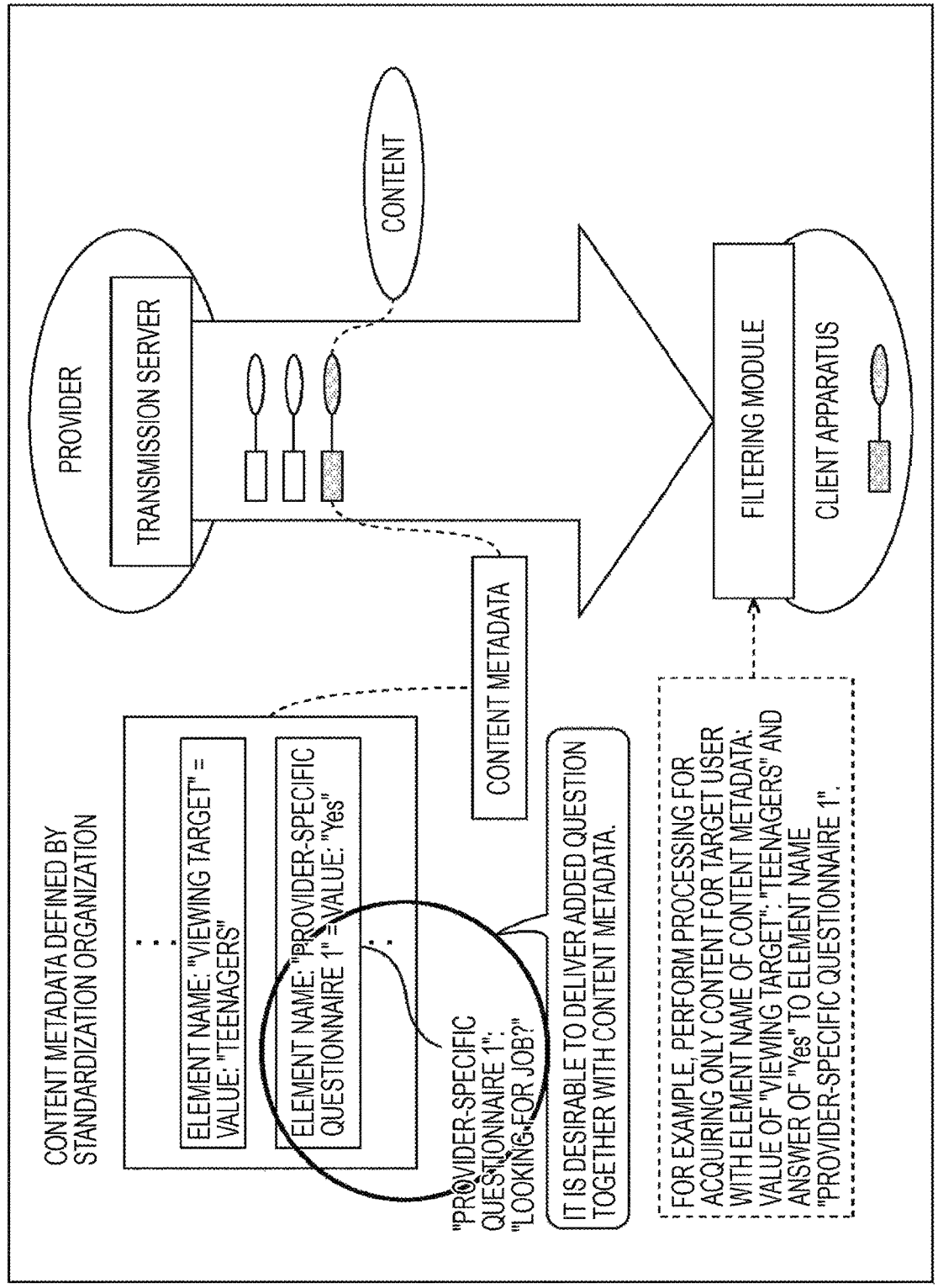

FIG. 8

```
 1:  <element name="PDITable">
 2:    <complexType>
 3:      <choice maxOccurs="unbounded">
 4:        <element name="QIA" type="pdi:QIAType"/>
 5:        <element name="QBA" type="pdi:QBAType"/>
 6:        <element name="QSA" type="pdi:QSAType"/>
 7:        <element name="QTA" type="pdi:QTAType"/>
 8:        <element name="QAA" type="pdi:QAAType"/>
 9:      </choice>
10:      <attribute name="protocolVersion" type="hexBinary" use="optional" default="10"/>
11:      <attribute name="pdiTableId" type="anyURI" use="required"/>
12:      <attribute name="pdiTableVersion" type="unsignedByte" use="required"/>
13:      <attribute name="time" type="dateTime" use="required"/>
14:      <attribute name="referredByAppUrl" type="anyUri" use="optional"/>
15:      <sequence>
16:        <element name="Q">
17:          <complexType>
18:            <sequence>
19:              <element name="QText" type="pdi:QTextType" maxOccurs="unbounded"/>
20:            </sequence>
21:            <attribute name="loEnd" type="int" use="optional"/>
22:            <attribute name="hiEnd" type="int" use="optional"/>
23:          </complexType>
24:        </element>
25:        <element name="A" minOccurs="0">
26:          <complexType>
27:            <attribute name="answer" type="int" use="required"/>
28:            <attribute name="time" type="dateTime" use="optional"/>
29:          </complexType>
30:        </element>
31:      </sequence>
32:      <attribute name="id" type="anyURI" use="required"/>
33:      <attribute name="expire" type="dateTime" use="optional"/>
34:      <attribute name="xactionSetId" type="unsignedShort" use="optional"/>
35:    </complexType>
```

FIG. 9

```
36:  <complexType name="QBAType">
37:    <sequence>
38:      <element name="Q">
39:        <complexType>
40:          <sequence>
41:            <element name="QText" type="pdi:QTextType" maxOccurs="unbounded"/>
42:          </sequence>
43:        </complexType>
44:      </element>
45:      <element name="A" minOccurs="0">
46:        <complexType>
47:          <attribute name="answer" type="boolean" use="required"/>
48:          <attribute name="time" type="dateTime" use="optional"/>
49:        </complexType>
50:      </element>
51:    </sequence>
52:    <attribute name="id" type="anyURI" use="required"/>
53:    <attribute name="expire" type="dateTime" use="optional"/>
54:    <attribute name="xactionSetId" type="unsignedShort" use="optional"/>
55:  </complexType>
56:  <complexType name="QSAType">
57:    <sequence>
58:      <element name="Q">
59:        <complexType>
60:          <sequence>
61:            <element name="QText" type="pdi:QTextType" maxOccurs="unbounded"/>
62:            <element name="Selection" minOccurs="2" maxOccurs="unbounded">
63:              <complexType>
64:                <simpleContent>
65:                  <extension base="string">
66:                    <attribute name="selectionId" type="unsignedByte" use="required"/>
67:                    <attribute name="lang" type="language" use="optional"/>
68:                  </extension>
69:                </simpleContent>
70:              </complexType>
71:            </element>
72:          </sequence>
73:          <attribute name="minChoices" type="unsignedByte" use="optional"/>
74:          <attribute name="maxChoices" type="unsignedByte" use="optional"/>
75:        </complexType>
76:      </element>
77:      <element name="A" minOccurs="0" maxOccurs="255">
78:        <complexType>
79:          <attribute name="answer" type="unsignedByte" use="required"/>
80:          <attribute name="time" type="dateTime" use="optional"/>
81:        </complexType>
82:      </element>
83:    </sequence>
84:    <attribute name="id" type="anyURI" use="required"/>
85:    <attribute name="expire" type="dateTime" use="optional"/>
86:    <attribute name="xactionSetId" type="unsignedShort" use="optional"/>
87:  </complexType>
```

FIG. 10

```
 88:  <complexType name="QTAType">
 89:    <sequence>
 90:      <element name="Q">
 91:        <complexType>
 92:          <sequence>
 93:            <element name="QText" type="pdi:QTextType" maxOccurs="unbounded"/>
 94:          </sequence>
 95:        </complexType>
 96:      </element>
 97:      <element name="A" minOccurs="0">
 98:        <complexType>
 99:          <attribute name="answer" type="string" use="required"/>
100:          <attribute name="time" type="dateTime" use="optional"/>
101:          <attribute name="lang" type="language" use="optional"/>
102:        </complexType>
103:      </element>
104:    </sequence>
105:    <attribute name="id" type="anyURI" use="required"/>
106:    <attribute name="expire" type="dateTime" use="optional"/>
107:    <attribute name="xactionSetId" type="unsignedShort" use="optional"/>
108:  </complexType>
109:  <complexType name="QAAType">
110:    <sequence>
111:      <element name="A" minOccurs="0">
112:        <complexType>
113:          <attribute name="answer" type="string" use="required"/>
114:          <attribute name="time" type="dateTime" use="optional"/>
115:        </complexType>
116:      </element>
117:    </sequence>
118:    <attribute name="id" type="anyURI" use="required"/>
119:    <attribute name="expire" type="dateTime" use="optional"/>
120:    <attribute name="xactionSetId" type="unsignedShort" use="optional"/>
121:  </complexType>
122:  <complexType name="QTextType">
123:    <simpleContent>
124:      <extension base="string">
125:        <attribute name="lang" type="language" use="optional"/>
126:      </extension>
127:    </simpleContent>
128:  </complexType>
```

FIG. 11

EXAMPLE OF PDI-Q

```
<PDITable pdiTableId='delivered-1' pdiTableVersion='1'>
  <QSA id='ProvideA:123' >
    <Q minChoices='1' >
      <QText>Which do you prefer, captions for adult or for children? </QText>
      <Selection selectionId='1'> For adults </Selection>
      <Selection selectionId='2'> For children </Selection>
    </Q>
  </QSA>
</PDITable>
```

FIG. 13

EXAMPLE OF PDI-A

```
<PDITable pdiTableId='answered-1' pdiTableVersion='1'>
 <QSA id='ProvideA:123'>
  <Q minChoices='1'>
   <QText>Which do you prefer, captions for adult or for children? </QText>
   <Selection selectionId='1'> For adults </Selection>
   <Selection selectionId='2'> For children </Selection>
  </Q>
  <A answer='2'/>
 </QSA>
</PDITable>
```

FIG. 14

PDI-A INCLUDED IN METADATA

A
```
<PDITable pdiTableId='answered-100' pdiTableVersion='1'>
 <QSA id='ProvideA:123'>
  <Q minChoices='1'>
   <QText>Which do you prefer, captions for adult or for children? </QText>
   <Selection selectionId='1'> For adults </Selection>
   <Selection selectionId='2'> For children </Selection>
  </Q>
  <A answer='2'/>
 </QSA>
</PDITable>
```

B
```
<PDITable pdiTableId='answered-101' pdiTableVersion='1'>
 <QSA id='ProvideA:123'>
  <Q minChoices='1'>
   <QText>Which do you prefer, captions for adult or for children? </QText>
   <Selection selectionId='1'> For adults </Selection>
   <Selection selectionId='2'> For children </Selection>
  </Q>
  <A answer='1'/>
 </QSA>
</PDITable>
```

FIG. 17

| serviceCategory | Meaning |
|---|---|
| 0 | Reserved |
| 1 | Linear A/V service |
| 2 | Linear audio only service |
| 3 | App-based service |
| 4 | ESG service (program guide) |
| 5 | EAS service (emergency alert) |
| 6 | PDI delivery service |
| Other values | Reserved for future use |

FIG. 18

```
<SLT ...>
  ...
  <Service ... serviceCategory="6" ...>
    ...
  </Service>
  ...
</SLT>
```

FIG. 19

5.2.2.1.1 ServiceType

The ServiceType element values are extended to include two proprietary ATSC 3.0 service types:

- A ServiceType element shall be included with value 228 to indicate that the Service fragment contains information regarding an ATSC 3.0 Linear service.
- A ServiceType element shall be included with value 229 to indicate that the Service fragment contains information regarding an ATSC 3.0 App-based service with app-based enhancement.

A ServiceType element shall be included with value 230 to indicate that the Service fragment contains information regarding an ATSC 3.0 PDI delivery service.

FIG. 20

```
<Service id='//a.com/Service-1'...>
  ...
  <ServiceType>230</ServiceType>
  ...
</Service>
```

RECEPTION APPARATUS, TRANSMISSION APPARATUS, AND DATA PROCESSING METHOD

TECHNICAL FIELD

The present technology relates to a reception apparatus, a transmission apparatus, and a data processing method, and in particular, to a reception apparatus, a transmission apparatus, and a data processing method capable of providing content according to the preferences of an end user.

BACKGROUND ART

In the digital broadcasting standards of each country, a moving picture experts group phase 2-transport stream (MPEG2-TS) method is adopted as a transmission method. In the future, however, it is expected that more advanced services will be provided by introducing an IP transmission method using Internet protocol (IP) packets used in the communication field for digital broadcasting.

For example, it has been determined to adopt the IP transmission method also in advanced television systems committee (ATSC) 3.0 that is one of the next generation terrestrial broadcasting standards (refer to Non-Patent Document 1).

CITATION LIST

Non-Patent Document

Non-Patent Document 1: ATSC Candidate Standard: Link-Layer Protocol (A/330)

SUMMARY OF THE INVENTION

Problems to be Solved by the Invention

Incidentally, in the digital broadcasting using the IP transmission method, a demand for making it possible to provide content according to the preferences of the end user is expected. In the present circumstances, however, no technical method for providing content according to the preferences of the end user has been established.

The present technology has been made in view of such a situation, and enables providing content according to the preferences of the end user.

Solutions to Problems

A reception apparatus according to a first aspect of the present technology is a reception apparatus including: a reception unit that receives content; and a processing unit that processes question information, which indicates a question about preferences of an end user and is delivered together with the content, on the basis of at least one of delivery information indicating that a service for providing dynamic metadata expressing the preferences of the end user is delivered or reference information indicating a reference destination of an application for generating first answer information indicating an answer set by the end user for the question about the preferences of the end user.

The reception apparatus according to the first aspect of the present technology may be an independent apparatus, or may be an internal block that forms one apparatus. In addition, a data processing method according to the first aspect of the present technology is a data processing method corresponding to the reception apparatus according to the first aspect of the present technology described above.

In the reception apparatus and the data processing method according to the first aspect of the present technology, the content is received, and the question information that indicates the question and is delivered together with the content is processed on the basis of at least one of the delivery information indicating that the service for providing dynamic metadata expressing the preferences of the end user is delivered or the reference information indicating the reference destination of the application for generating the first answer information indicating the answer set by the end user for the question about the preferences of the end user.

A transmission apparatus according to a second aspect of the present technology is a transmission apparatus including: a generation unit that generates at least one of delivery information indicating that a service for providing dynamic metadata expressing preferences of an end user is delivered or reference information indicating a reference destination of an application for generating first answer information indicating an answer set by the end user for a question about the preferences of the end user; and a transmission unit that transmits question information indicating the question and at least one of the delivery information or the reference information together with content.

The transmission apparatus according to the second aspect of the present technology may be an independent apparatus, or may be an internal block that forms one apparatus. In addition, a data processing method according to the second aspect of the present technology is a data processing method corresponding to the transmission apparatus according to the second aspect of the present technology described above.

In the transmission apparatus and the data processing method according to the second aspect of the present technology, at least one of the delivery information indicating that the service for providing dynamic metadata expressing the preferences of the end user is delivered or the reference information indicating the reference destination of the application for generating the first answer information indicating the answer set by the end user for the question about the preferences of the end user is generated, and the question information indicating the question and the delivery information, or the reference information is transmitted together with the content.

Effects of the Invention

According to the first and second aspects of the present technology, it is possible to provide the content according to the preferences of the end user.

In addition, the effects described herein are not necessarily limited, and may be any of the effects described in the present disclosure.

BRIEF DESCRIPTION OF DRAWINGS

FIG. 7 is a diagram illustrating an example of content filtering in an ideal content delivery service.

FIG. 8 is a diagram illustrating an example of a PDI schema.

FIG. 9 is a diagram illustrating an example of the PDI schema.

FIG. 10 is a diagram illustrating an example of the PDI schema.

FIG. 11 is a diagram illustrating a description example of PDI-Q.

FIG. 13 is a diagram illustrating a description example of PDI-A.

FIG. 14 is a diagram illustrating an example of PDI-A included in metadata.

FIG. 17 is a diagram illustrating an example of a value of a serviceCategory attribute of SLT metadata.

FIG. 18 is a diagram illustrating a description example of SLT metadata.

FIG. 19 is a diagram illustrating an example of a value of a ServiceType element of ESG.

FIG. 20 is a diagram illustrating a description example of ESG information.

MODE FOR CARRYING OUT THE INVENTION

Figure 1:
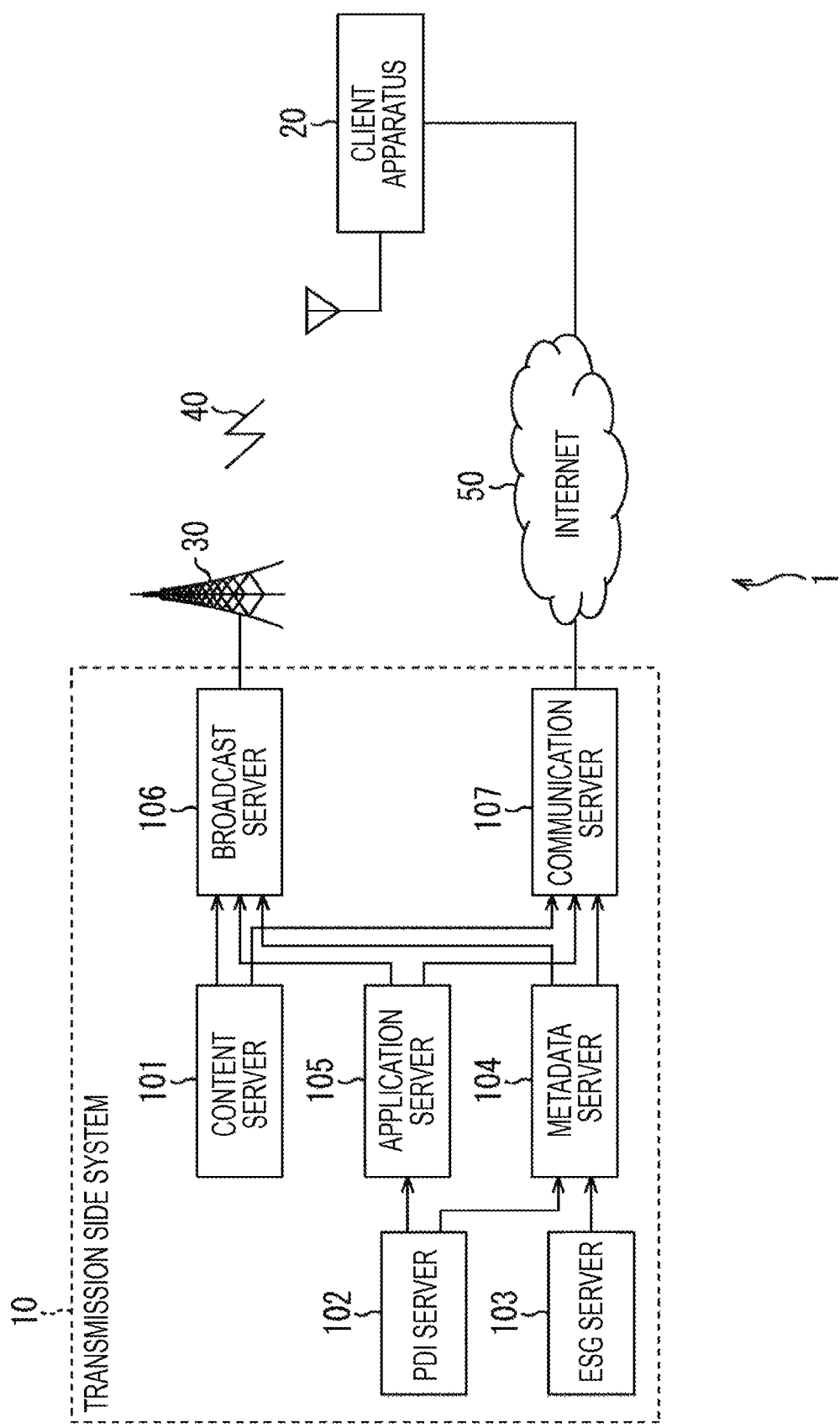
FIG. 1 is a block diagram illustrating a configuration of an embodiment of a transmission system to which the present technology is applied.

Hereinafter, an embodiment of the present technology will be described with reference to the diagrams. In addition, the description will be given in the following order.

1. Configuration of a system
2. Outline of the present technology
3. PDI correspondence processing
(1) First PDI processing method
(1-1) Delivery method of delivery information
(1-2) Delivery method of reference information
(1-3) PDI correspondence processing of pattern 1
(1-4) PDI correspondence processing of pattern 2
(2) Second PDI processing method
(3) Content filtering processing using PDI
4. Modification example
5. Configuration of a computer 1. Configuration of a System (Configuration Example of a Transmission System)

FIG. 1 is a block diagram illustrating a configuration of an embodiment of a transmission system to which the present technology is applied. In addition, a system means that a plurality of apparatuses are logically gathered.

In FIG. 1, a transmission system 1 includes a transmission side system 10 and a reception side client apparatus 20. In the transmission system 1, data transmitted from the transmission side system 10 is received by the client apparatus 20 through a transmission path 40 as a broadcast network or the Internet 50 as a communication network.

The transmission side system 10 includes a content server 101, a PDI server 102, an ESG server 103, a metadata server 104, an application server 105, a broadcast server 106, and a communication server 107.

The content server 101 processes content, such as a program, and transmits stream data of the content to the broadcast server 106 or the communication server 107.

The PDI server 102 generates a PDI-Q and transmits the PDI-Q to the metadata server 104 and the application server 105.

Here, the preference demographic and interest (PDI) is a dynamic metadata mechanism expressing the preferences of the end user and the like, the dynamic metadata mechanism including a question to the end user and an answer to the question. In addition, although the details of the PDI will be described later with reference to FIGS. 6 to 15, the PDI includes PDI-Q, PDI-A, and PDI-S.

The PDI-Q (question) is information (hereinafter, also referred to as question information) indicating a question about the preferences of the end user. The PDI-A (answer) is information (hereinafter, also referred to as answer information) indicating an answer set for the question of the PDI-Q. The PDI-S (script) indicates a script for acquiring the PDI-A. Hereinafter, an application corresponding to the PDI-S will be referred to as a PDI-S application.

The ESG server 103 generates electronic service guide (ESG) information and transmits the ESG information to the metadata server 104. In addition, although the details will be described later with reference to FIG. 5 and the like, the ESG information is program information.

The metadata server 104 generates control information (signaling) and transmits the control information (signaling) to the broadcast server 106 or the communication server 107. In addition, the metadata server 104 can process the PDI-Q from the PDI server 102 or the ESG information from the ESG server 103 and transmit data obtained as a result thereof to the broadcast server 106 or the communication server 107.

The application server 105 generates an application and transmits the application to the broadcast server 106 or the communication server 107. For example, the application server 105 can generate a PDI-S application on the basis of the PDI-Q from the PDI server 102.

The broadcast server 106 receives the stream data of the content from the content server 101, the control information or the ESG information from the metadata server 104, and the data of the application from the application server 105.

The broadcast server 106 processes the stream data of the content, the control information or the ESG information, data of the application and the like, and transmits transmission data obtained as a result thereof to transmission equipment installed in a transmission station 30 through a predetermined line, such as a leased line.

The transmission equipment in the transmission station 30 performs required processing (modulation processing or the like) on the transmission data from the broadcast server 106, and a broadcast signal (broadcast wave) obtained as a result thereof is received by the client apparatus 20 through the transmission path 40.

The communication server 107 is a server that provides various kinds of data through the Internet 50 in response to a request from the client apparatus 20.

The communication server 107 receives and processes the stream data of the content from the content server 101, the control information or the ESG information from the metadata server 104, and the data of the application from the application server 105.

The communication server 107 delivers the stream data of the content, the control information, the ESG information, or the application through the Internet 50 in response to a request from the client apparatus 20.

The client apparatus 20 is, for example, a fixed receiver, such as a television receiver, a set top box (STB), a network storage, or a game machine, or a mobile receiver, such as a smartphone, a mobile phone, or a tablet computer.

In addition, the client apparatus 20 may be a wearable computer, such as a head mounted display (HMD). In addition, the client apparatus 20 may be an apparatus mounted on an automobile, such as a vehicle-mounted television, for example.

By receiving and processing the broadcast signal transmitted from the broadcast server 106 through the transmission path 40, the client apparatus 20 can reproduce the content such as a program delivered through broadcasting. In addition, by processing the stream data delivered from the communication server 107 through the Internet 50, the client apparatus 20 can reproduce the content such as a program delivered through communication.

The client apparatus 20 can execute the application by processing the data of the application delivered from the broadcast server 106 or the communication server 107. In addition, the client apparatus 20 can perform processing relevant to the PDI. In addition, the detailed configuration of the client apparatus 20 will be described later with reference to FIGS. 3 and 4.

In addition, in the transmission system 1 illustrated in FIG. 1, only one client apparatus 20 is shown for simplicity of description. However, a plurality of client apparatuses 20 can be provided. In addition, broadcast signals transmitted (simultaneously delivered) from the broadcast server 106 can be simultaneously received by the plurality of client apparatuses 20 through the transmission path 40.

(Configuration Example of Each Server)

Figure 2:
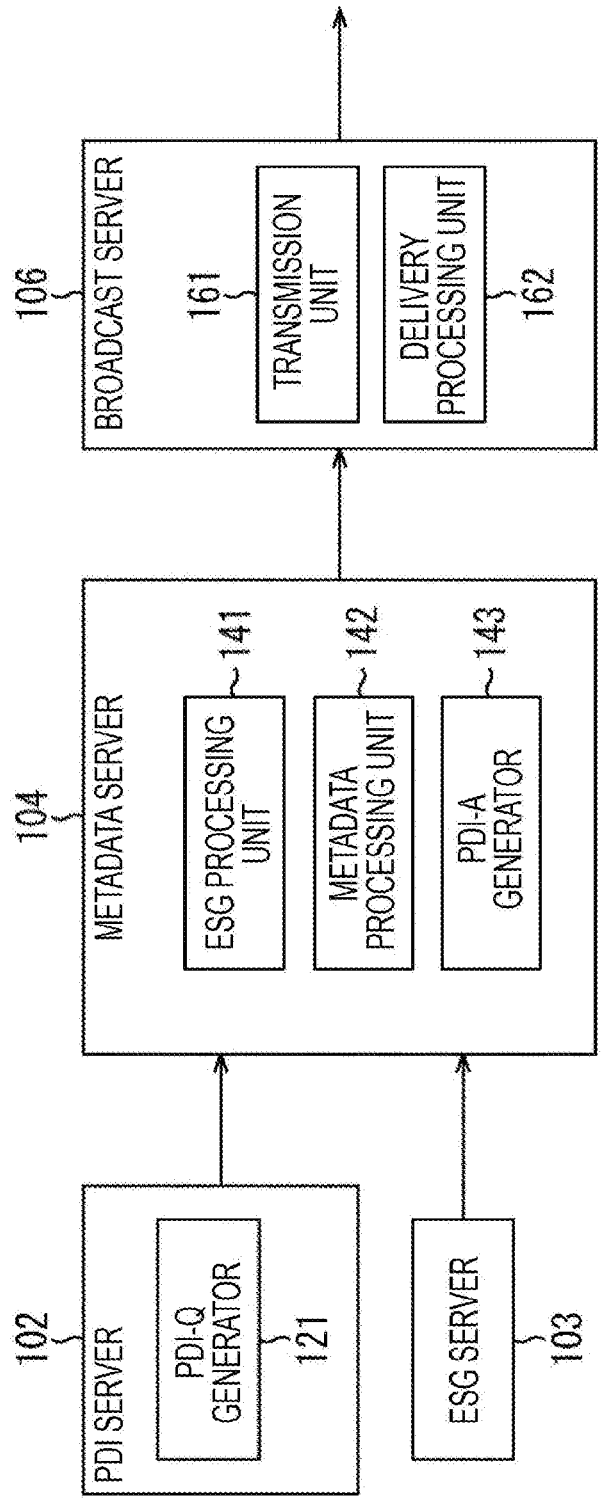
FIG. 2 is a block diagram illustrating a configuration example of each server.

FIG. 2 is a block diagram illustrating a configuration example of each server illustrated in FIG. 1.

In FIG. 2, the PDI server 102, the ESG server 103, the metadata server 104, and the broadcast server 106 among servers forming the transmission side system 10 illustrated in FIG. 1 are illustrated, and these servers will be mainly described.

The PDI server 102 has a PDI-Q generator 121. The PDI-Q generator 121 generates a PDI-Q and transmits the PDI-Q to the metadata server 104.

The ESG server 103 generates ESG information and transmits the ESG information to the metadata server 104.

The metadata server 104 has an ESG processing unit 141, a metadata processing unit 142, and a PDI-A generator 143.

The ESG processing unit 141 processes the ESG information from the ESG server 103 and transmits the processed ESG information to the broadcast server 106. Here, the ESG information can include information (hereinafter, also referred to as delivery information) indicating that the PDI delivery service is being delivered.

The metadata processing unit 142 processes control information (metadata included therein) delivered together with the content, and transmits the processed control information to the broadcast server 106. Here, the control information (SLT metadata to be described later) can include delivery information.

The PDI-A generator 143 generates a PDI-A on the basis of the PDI-Q from the PDI server 102, and supplies the PDI-A to the ESG processing unit 141 or the metadata processing unit 142.

The ESG processing unit 141 can include the PDI-A from the PDI-A generator 143 in the ESG information. In addition, the metadata processing unit 142 can include the PDI-A from the PDI-A generator 143 in the control information (MPD metadata to be described later).

The broadcast server 106 has a transmission unit 161 and a delivery processing unit 162.

The transmission unit 161 transmits the control information or the ESG information from the metadata server 104 together with the content from the content server 101. In addition, the transmission unit 161 can transmit the application from the application server.

The delivery processing unit 162 can deliver information (hereinafter, also referred to as reference information) indicating the reference destination of the PDI-S application according to the delivery method. Here, the reference information is, for example, a uniform resource locator (URL), and can be included in, for example, control information of a session delivering the PDI delivery service (EFDT to be described later), a header (HTTP header to be described later) of a file of the PDI-Q, or the like.

Each server is configured as described above.

(Configuration Example of a Client Apparatus)

Figure 3:
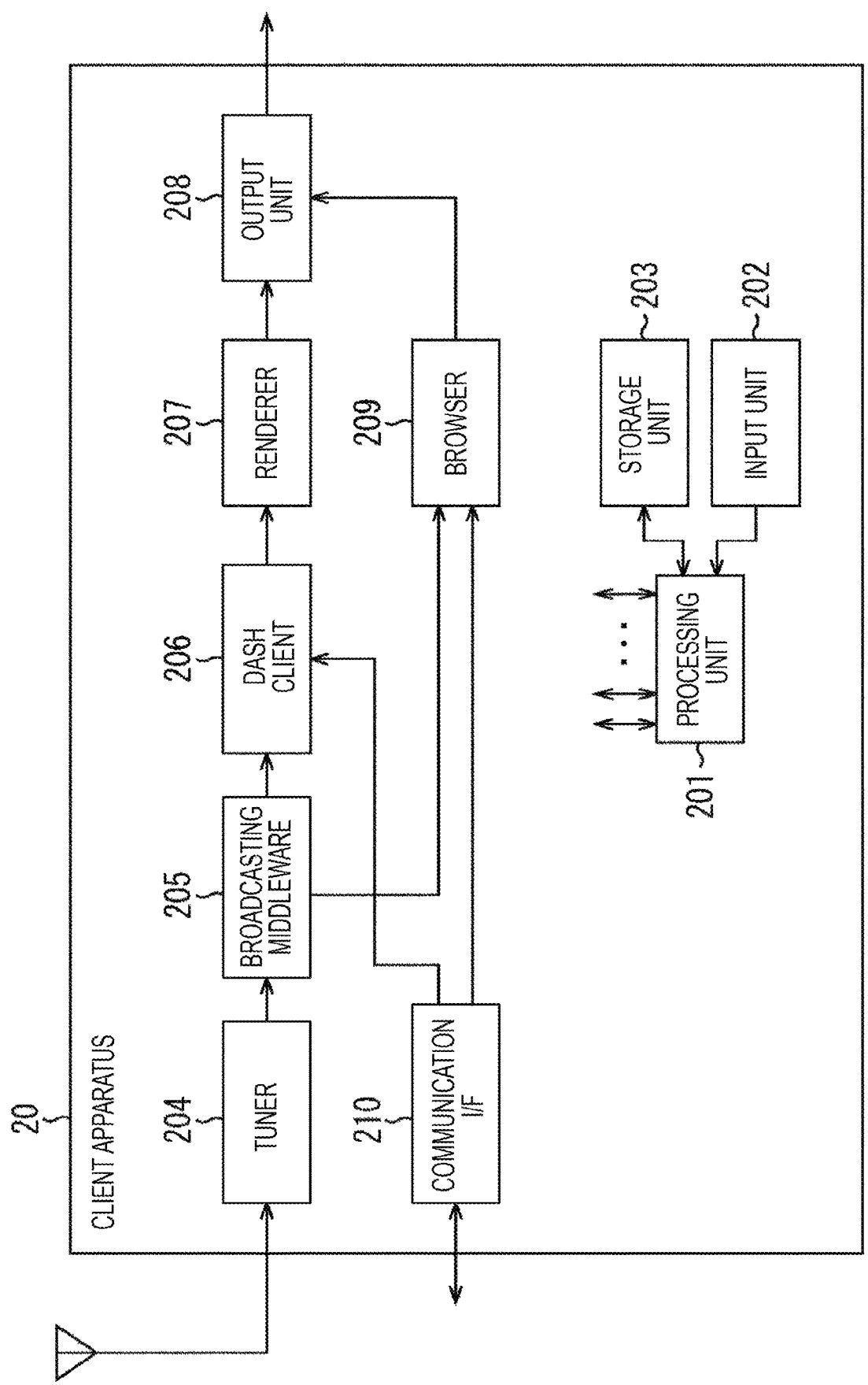
FIG. 3 is a block diagram illustrating a configuration example of a client apparatus.

FIG. 3 is a block diagram illustrating a configuration example of the client apparatus 20 illustrated in FIG. 1.

In FIG. 3, the client apparatus 20 includes a processing unit 201, an input unit 202, a storage unit 203, a tuner 204, a broadcast middleware 205, a DASH client 206, a renderer 207, an output unit 208, a browser 209, and a communication I/F 210.

The processing unit 201 includes, for example, a central processing unit (CPU), a microprocessor, and the like. The processing unit 201 operates as a central processing unit in the client apparatus 20, such as various kinds of arithmetic processing and operation control of each unit. The processing unit 201 can transmit and receive various kinds of data to and from each unit in the client apparatus 20.

The input unit 202 is, for example, a physical button or the like, and supplies an operation signal corresponding to the user's operation to the processing unit 201. The processing unit 201 controls the operation of each unit on the basis of the operation signal supplied from the input unit 202.

The storage unit 203 includes, for example, a semiconductor memory, a hard disk drive (HDD), and the like. The storage unit 203 stores various kinds of data according to the control from the processing unit 201.

The tuner 204 receives and processes the broadcast signal transmitted from the broadcast server 106 through an antenna, and supplies data obtained as a result thereof to the broadcast middleware 205.

The broadcast middleware 205 processes the data supplied from the tuner 204, and supplies the processed data to the processing unit 201, the DASH client 206, or the browser 209 according to the type of the data obtained as a result thereof.

Here, among the data to be processed, the stream data (DASH segment) of the content is supplied to the DASH client 206, and the data of the application is supplied to the browser 209. In addition, the control information, the ESG information, and the PDI information are supplied to the processing unit 201.

The DASH client 206 processes the DASH segment supplied from the broadcast middleware 205, and supplies video and audio data obtained as a result thereof to the renderer 207. In addition, in practice, the video and audio data obtained by processing the DASH segment are decoded by a decoder and then supplied to the renderer 207.

The renderer 207 performs rendering processing on the video and audio data supplied from the DASH client 206, and supplies data obtained as a result thereof to the output unit 208.

The output unit 208 outputs the video and audio data supplied from the renderer 207. With this arrangement, in the client apparatus 20, content such as a program is reproduced, and the image or the sound is output.

In addition, the content, such as a program, may be recorded. In addition, a display for displaying an image or a speaker for outputting sound may be provided not only inside the client apparatus 20 but also outside the client apparatus 20 so that data from the output unit 208 is supplied thereto.

The browser 209 is a browser corresponding to hypertext markup language 5 (HTML5), for example. The browser 209 processes the data of the application supplied from the broadcast middleware 205, and supplies data obtained as a result thereof to the output unit 208. With this arrangement, in the client apparatus 20, the image of the application is displayed. For example, the browser 209 can execute the PDI-S application.

The communication I/F 210 includes a communication interface circuit and the like. The communication I/F 210 transmits and receives various kinds of data to and from the communication server 107 through the Internet 50.

Here, among the data to be received, the stream data (DASH segment) of the content is supplied to the DASH client 206, and the data of the application is supplied to the browser 209. In addition, the control information, the ESC information, and the PDI information are supplied to the processing unit 201.

In addition, since processing on the pieces of data acquired through the communication is similar to the processing on the data acquired through the broadcast described above, the description thereof will be omitted herein.

The client apparatus 20 is configured as described above.

(Configuration of a Processing Unit)

Figure 4:
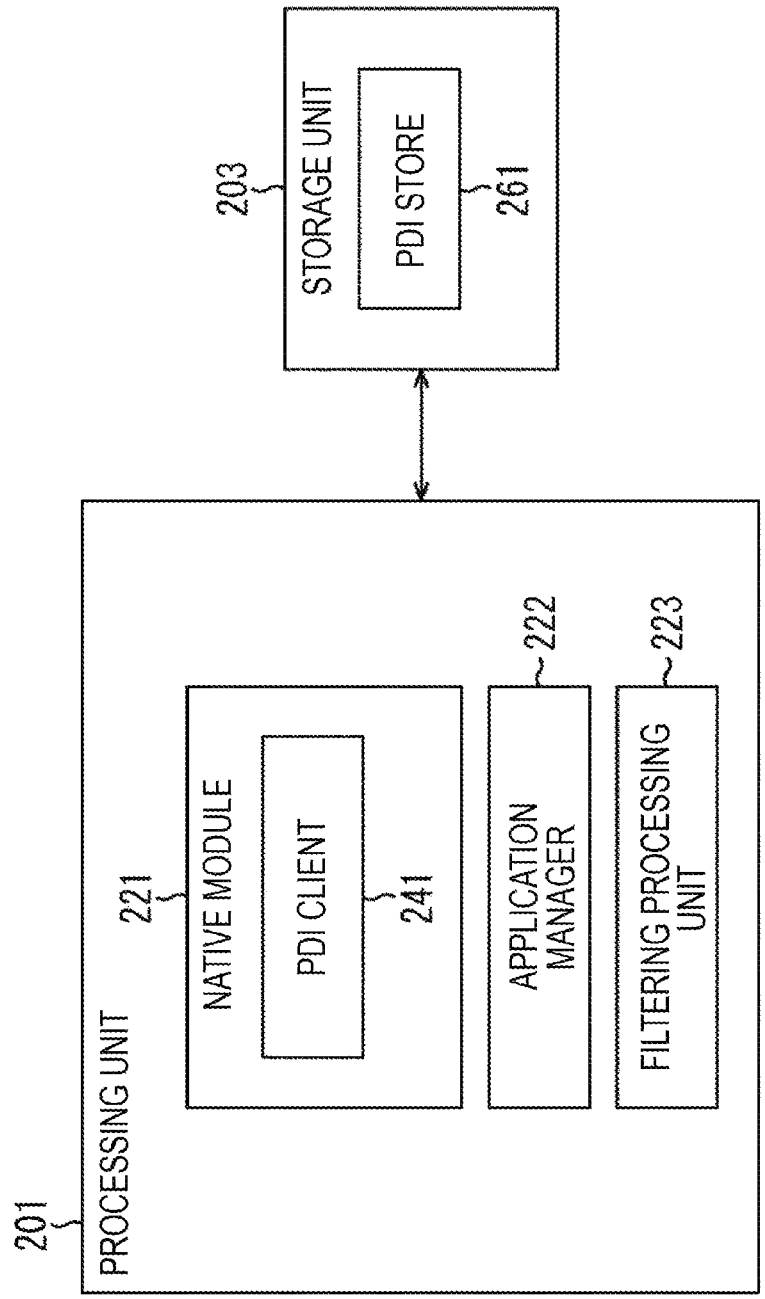
FIG. 4 is a block diagram illustrating the details of the configuration of a processing unit.

FIG. 4 is a block diagram illustrating the details of the configuration of the processing unit 201 illustrated in FIG. 3.

In FIG. 4, the processing unit 201 has a native module 221, an application manager 222, and a filtering processing unit 223. In addition, the storage unit 203 includes a PDI store 261 that stores the PDI-Q or the PDI-A.

The native module 221 is executed as a so-called native application in the environment of an operating system (OS) activated by the client apparatus 20 or the like. The native module 221 has a PDI client 241.

The PDI client 241 performs processing relevant to the PDI as a native application. For example, the PDI client 241 generates a PDI-A on the basis of the PDI-Q.

The application manager 222 manages an application as a so-called web application. For example, the application manager 222 manages acquisition or activation of the PDI-S application.

The filtering processing unit 223 specifies the content to be acquired by performing PDI-A matching processing. In addition, the filtering processing unit 223 performs filtering processing of the specific content according to the result of the matching processing.

The processing unit 201 is configured as described above.

2. Outline of the Present Technology (Protocol Stack of the Present Technology)

Figure 5:
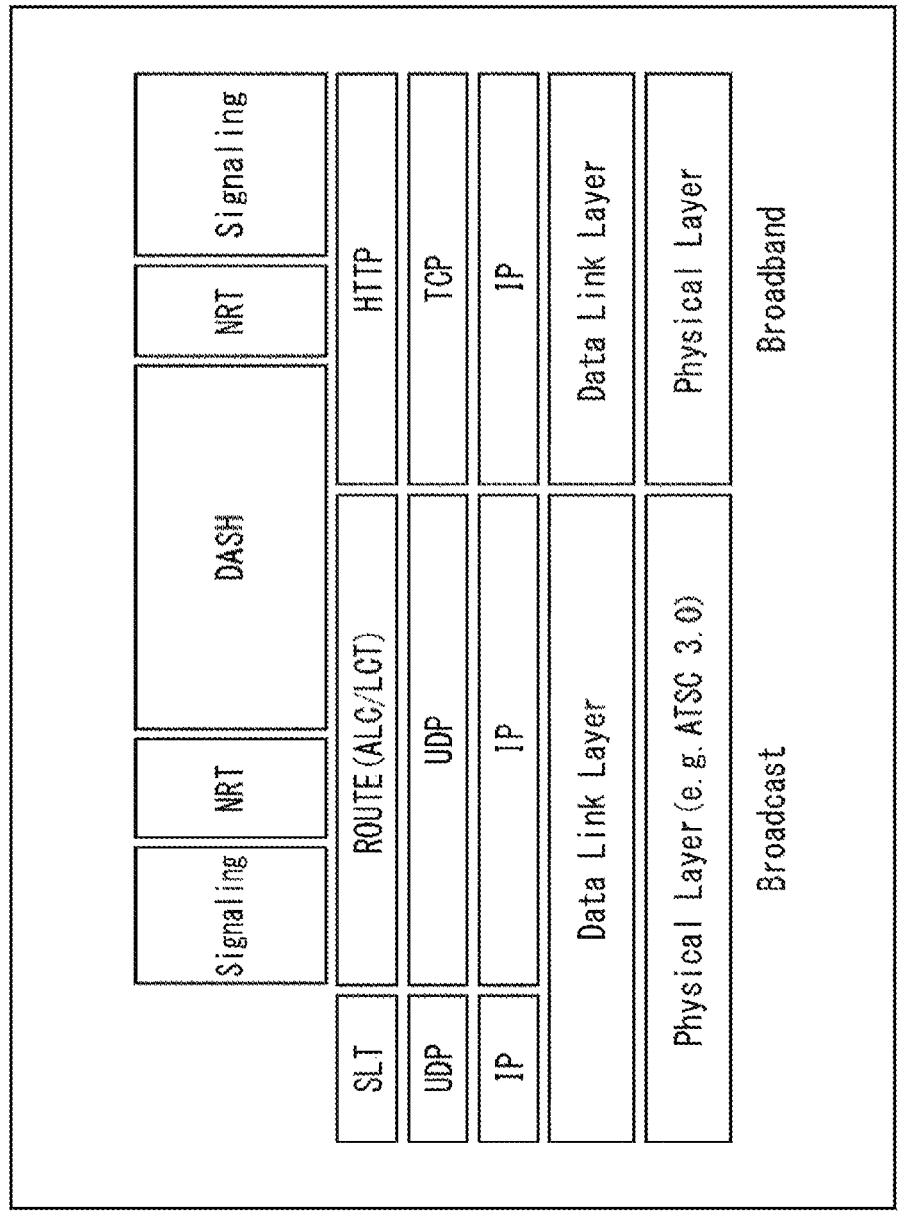
FIG. 5 is a diagram illustrating an example of a protocol stack in an IP transmission method of the present technology.

FIG. 5 is a diagram illustrating an example of a protocol stack in an IP transmission method of the present technology.

Currently, the MPEG2-TS (transport stream) system is widely used as a transmission method of digital broadcasting. In the future, however, it is expected that an IP transmission method using Internet protocol (IP) packets used in the communication field for digital broadcasting will spread.

For example, it is expected that the IP transmission method is also adopted in advanced television systems committee (ATSC) 3.0, which is one of the next generation terrestrial broadcasting standards, so that the more advanced services can be provided. Also in the present technology, the IP transmission method can be adopted similarly to the broadcasting method, such as ATSC3.0.

In FIG. 5, the lowest hierarchy is a physical layer. In the digital broadcasting using the IP transmission method, such as ATSC3.0, there is a case where some data is transmitted by using bidirectional communication without being limited to transmission using unidirectional broadcasting. However, in a case where the broadcast is used, a frequency band of a broadcast wave or the like allocated for the service (channel) corresponds to the physical layer.

An upper hierarchy than the physical layer is a data link layer. In addition, upper hierarchies than the data link layer are an Internet protocol (IP) layer and a user datagram protocol (UDP) layer. The IP layer and the UDP layer are layers corresponding to a network layer and a transport layer in the hierarchical model of communication, and the IP packet and the UDP packet are specified by the IP address and the port number.

Here, in ATSC3.0, using low level signaling (LLS) and service layer signaling (SLS) as control information (signaling) is assumed. The LLS is control information transmitted in a lower layer than the SLS. The SLS is control information for each service. That is, in ATSC3.0, control information of the transport layer is transmitted in two hierarchies of LLS and SLS.

The LLS includes metadata, such as service list table (SLT). The SLT metadata includes basic information indicating the configuration of streams or broadcasting services in a broadcast network, such as information necessary for channel selection of broadcasting services (channels). The SLT metadata is transmitted in a state in which the SLT metadata is included in a UDP/IP packet that is an IP packet including a UDP packet. However, the UDP/IP packet in which the SLT metadata is stored is transmitted with a special IP address and a special port number.

An upper hierarchy adjacent to the IP layer and the UDP layer is real-time object delivery over unidirectional transport (ROUTE). The ROUTE is a protocol for streaming file transfer, and is an extension of file delivery over unidirectional transport (FLUTE).

By the ROUTE session, a file (Signaling) of SLS, a file (NRT) of non real time (NRT) content, DASH segment file (DASH), and the like are transmitted for each broadcasting service.

Here, the SLS is control information of the service level, and provides information, attributes, and the like necessary for search and selection of a component belonging to the target broadcasting service. The SLS includes metadata, such as user service bundle description (USBD), service-based transport session instance description (S-TSID), media presentation description (MPD), and HTTP entry location description (HELD).

The USBD metadata includes information, such as the acquisition destination of other pieces of metadata.

The S-TSID metadata is an extension of LCT session instance description (LSID) for ATSC3.0, and is control information of the ROUTE protocol. In addition, the S-TSID metadata can specify extended FDT (EFDT) transmitted by the ROUTE session. The EFDT is an extension of file delivery table (FDT) introduced by the FLUTE, and is control information for transfer.

The MPD metadata is control information of a video or audio file used for streaming delivery conforming to the dynamic adaptive streaming over HTTP (MPEG-DASH). The HELD metadata is control information of an application.

Here, the MPEG-DASH is a streaming delivery standard according to over the top video (OTT-V), and is a standard relevant to adaptive streaming delivery using a streaming protocol based on a hypertext transfer protocol (HTTP).

According to the MPEG-DASH standard, a manifest file for describing metadata, which is control information of a video or audio file, and a file format for transmitting the content of a moving image are defined. Here, the former manifesto file is referred to as media presentation description (MPD), and the latter file format is also referred to as a segment format.

In addition, in a case where the ROUTE is used as a transport protocol, an MP4 file format can be used as a file format of streaming. The MP4 file format is a derivative format of an ISO base media file format (ISOBMFF) defined by ISO/IEC 14496-12.

The segment transmitted by the ROUTE session includes an initialization segment (IS) and a media segment (MS). The initialization segment includes initialization information, such as a data compression method. In addition, the media segment stores video or audio and stream data of captions. That is, the media segment corresponds to a DASH segment (DASH segment file).

In this manner, stream data of service components (video or audio, captions, and the like) forming the content, such as a program, is transmitted by the ROUTE session in units of a DASH segment conforming to the ISOBMFF standard.

In addition, the NRT content is content that is reproduced after being once accumulated in a storage of a receiver. In addition, for example, files other than the NRT content, such as files of applications or electronic service guide (ESG), can be transmitted by the ROUTE session. In addition, in the PDI delivery service, all relevant files can be transmitted similarly to the NRT content.

In addition, SLT metadata as LLS or metadata, such as USBD, S-TSID, and MPD as SLS, can be data in a text format described by a markup language, such as an extensible markup language (XML), for example.

On the other hand, in a case where bidirectional communication (Broadband) is used, an upper hierarchy than the physical layer is a data link layer. In addition, an upper hierarchy than the data link layer is an IP layer corresponding to the network layer. An upper hierarchy adjacent to the IP layer is a transmission control protocol (TCP) layer corresponding to the transport layer, and an upper hierarchy adjacent to the TCP layer is an HTTP layer corresponding to the application layer.

That is, protocols such as TCP/IP running on a communication line, such as the Internet, are implemented by these hierarchies.

Some of the upper hierarchies adjacent to the HTTP layer are control information (Signaling) and NRT content (NRT). As the control information, all pieces of control information, such as the control information transmitted by the ROUTE session described above, are included. In addition, the NRT content is content acquired through communication, and includes, for example, an application.

A hierarchy other than the above-described hierarchies among the upper hierarchies adjacent to the HTTP layer is a DASH segment (DASH). That is, in streaming delivery of the bidirectional communication system, stream data of service components (video or audio, captions, and the like) forming the content, such as a video on demand (VOD) program, is transmitted in units of a DASH segment conforming to the ISOBMFF standard.

As described above, in the protocol stack based on the IP transmission method of the present technology, some of the hierarchies of the unidirectional broadcast system and the hierarchies of the bidirectional communication system are common protocols. Therefore, in unidirectional broadcasting and bidirectional communication, stream data of service components forming the content can be transmitted in units of a DASH segment conforming to the ISOBMFF standard.

For this reason, in a case where both the streaming delivery of the unidirectional broadcast system and the streaming delivery of the bidirectional communication system are performed, it is possible to reduce the burden of implementation or the burden of processing in each apparatus since the protocols of the upper hierarchies are common.

(Example of General Content Filtering)

Figure 6:
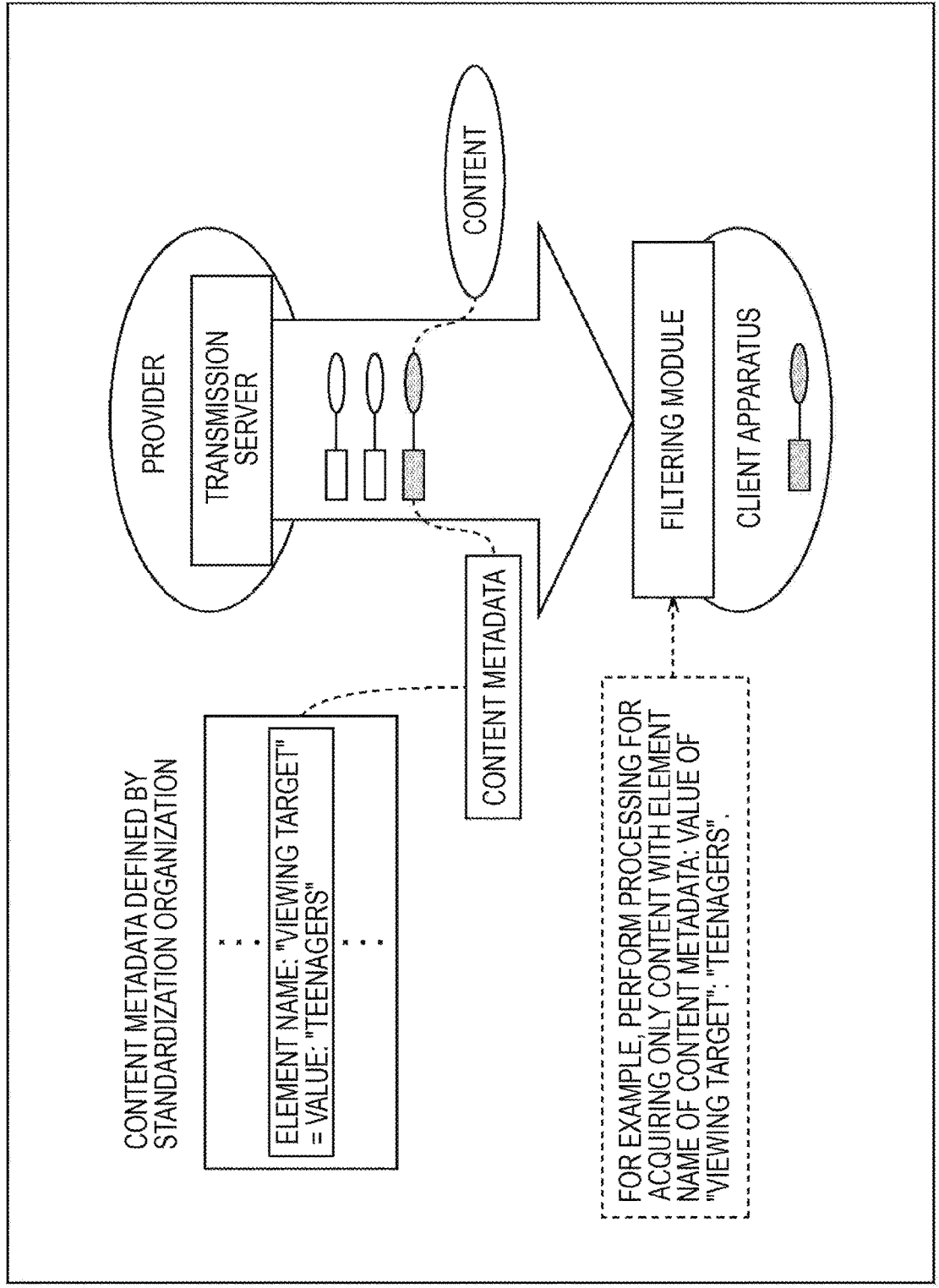
FIG. 6 is a diagram illustrating an example of content filtering in a general content delivery service.

FIG. 6 is a diagram illustrating an example of content filtering in a general content delivery service.

As illustrated in FIG. 6, in the general content delivery service, content filtering processing in a client apparatus (filtering module thereof) that receives content is performed by assigning a filtering attribute set in a transmission server on the provider side that provides content to the content as content metadata (filtering attribute).

The content metadata is set as a value for an element of metadata selected from a metadata set defined by the standardization organization, such as advanced television systems committee standards (ATSC) or association of radio industries and business (ARIB).

That is, for example, content to which content metadata in which "viewing target" is selected as an element name and "teenagers" is set as a value for the element is assigned is provided to a client apparatus that performs filtering processing so that "content for viewers who are teenagers" is acquired.

However, content metadata (filtering attribute) not included in the metadata set defined by the standardization organization is not assigned to the content.

For example, even in a case where the provider side desires to deliver "content for viewers who are teenagers and are interested in job seeking activities", content metadata in which "interested in job seeking activities" is set cannot be assigned to the content in a case where "whether or not there is an interest in job seeking activities" is not present as an element of content metadata in the metadata set defined by the standardization organization.

Therefore, on the provider side, it was not possible to deliver content in which the interests of an end user were assigned as content metadata corresponding to the needs at that time (for example, considering the trend). On the other hand, in such a case, in the client apparatus, it was not possible to perform filtering processing for acquiring the content corresponding to the needs at that time.

(Example of Ideal Content Filtering)

FIG. 7 is a diagram illustrating an example of content filtering in an ideal content delivery service.

For example, in a case where the provider side desires to deliver "content for viewers who are teenagers and are interested in job seeking activities", when the criteria "whether or not there is an interest in job seeking activities" is not included in the content metadata defined by the standardization organization, it is necessary to listen to the preference "interested in job seeking activities" in advance from the end user using any method and set the preference in the client apparatus (filtering module thereof).

Here, as illustrated in FIG. 7, as content metadata, in addition to "viewing target"="teenagers", provider-specific questionnaire 1 is defined as an element name, and "YES" is included as a value for the element. That is, as the provider-specific questionnaire 1, "looking for a job?" is set. Accordingly, in a case where "YES" is set as the value, this indicates that job seeking is in progress (interested in job seeking activities).

By delivering the content to which such content metadata is assigned, the client apparatus can perform filtering processing for acquiring only content to which, for example, "viewing target"="teenagers" and "provider-specific questionnaire 1"="YES" are assigned as content metadata, that is, only content for viewers who are teenagers and are interested in job seeking activities.

In addition, here, it is desirable to deliver a question to be added together with the content metadata. In addition, in a case where the content of a question provided by the provider requires a high level of interactivity (a question that conditionally branches according to the user's response), it is desirable that a questionnaire is not only simply delivered to the client apparatus but also delivered as an application executed by a script or the like that performs interaction with an end user so that the preferences of the end user are accurately figured out.

In addition, in the case of content whose development cannot be predicted in advance, such as a live broadcast program delivered in real time, it may be desired to perform control to select streams according to the mood at that point in time or the preferences of the end user or to select and execute an application (script) downloaded in association with the content by performing interaction with the end user at the start of delivery of the content or during the delivery.

In this case, it is desirable that processing for figuring out the preferences of the end user is performed at the same time as the content is delivered (or immediately before the start of delivery or during the delivery) by using the above-described interactive script or the like.

Here, as a method of performing processing for figuring out the preferences of the end user by using such an interactive script or the like and delivering content to which content metadata corresponding to the needs at that time other than the content metadata defined by the standardization organization is assigned, there is preference demographic and interest (PDI) adopted in ATSC2.0 (refer to Non-Patent Document 2 below).

Non-Patent Document 2: ATSC Standard: Interactive Services Standard (Example of a PDI Schema)

FIGS. 8 to 10 illustrate an example of a PDI schema. In addition, in FIGS. 8 to 10, line numbers are described in respective lines for convenience of description.

In FIG. 8, declaration of the name and type of each question is shown in the fourth to eighth lines.

Specifically, the question type "pdi:QIAType" defined by the name of "QIA" in the fourth line indicates that the question is a question asking for an integer type answer. In addition, the question type "pdi:QBAType" defined by the name of "QBA" in the fifth line indicates that the question is a question asking for a logical value type answer.

The question type "pdi:QSAType" defined by the name of "QSA" in the sixth line indicates that the question is a question asking for an answer candidate selection type answer. In addition, the question type "pdi:QTAType" defined by the name of "QTA" in the seventh line indicates that the question is a question asking for a character string type answer.

The question type "pdi:QAAType" defined by the name of "QAA" in the eighth line indicates that the question is a question that does not limit the type of answer. The following lines indicate the declaration of an element of each question declared as described above.

In addition, in the 14th line, a referredByAppUrl element is defined as an optional element. The referredByAppUrl element is an element newly added in order to provide notification of reference information (for example, a URL) indicating the reference destination of the PDI-S application.

That is, the referredByAppUrl element makes it possible to directly describe the URL of the PDI-S application in the PDI instance. The details of the referredByAppUrl element as the reference information will be described later.

Here, as the PDI, there are PDI-Q (question) that is information (question information) indicating a question about the preferences of the end user, PDI-A (answer)

(hereinafter, also referred to as client side PDI-A) that is information (answer information) indicating an answer set for the question of PDI-Q by the end user, and PDI-A (hereinafter, referred to as a provider side PDI-A) that is information (answer information) indicating an answer set for the question of PDI-Q by the provider.

The PDI schema illustrated in FIGS. 8 to 10 is an example of an XML schema for defining the structure of PDI-Q that is an extensible markup language (XML) document. However, the XML schema for defining the structure of the PDI-A, which is an answer to the question defined as the PDI-Q, basically has a similar structure as the XML schema that defines the structure of the PDI-Q.

In addition, the structure of the PDI-Q or the PDI-A defined by the XML schema is not limited to the structure illustrated in FIGS. 8 to 10, and other structures can be adopted.

(Description Example of PDI-Q)

FIG. 11 is a diagram illustrating a description example of the PDI-Q.

In FIG. 11, a Q element, a QText element, and a Selection element are described between the start tag and the end tag of the QSA element, so that a question asking for an answer candidate selection type answer is defined. In addition, in the id element of the QSA element, "ProviderA:123" is described as an identifier of a set of a question and an answer candidate.

"1" is designated as the minChoice attribute of the Q element, which means that the number of choices for the answer is limited to one.

In the QText element, as a question, "Which do you prefer, captions for adult or for children?" is described.

In the Selection element, "For adults" to which a selectionId attribute of "1" is assigned and "For children" to which a selectionId attribute of "2" is assigned are described as choices for the answer to the question.

(Display Example of a Question and an Answer)

Figure 12:
FIG. 12 is a diagram illustrating an example of a screen of a question and an answer.

FIG. 12 is a diagram illustrating an example in which a client apparatus displays a screen (interactive screen with an end user) of a question and an answer defined in the PDI-Q (FIG. 11) received from a transmission server.

In FIG. 12, a question "Which do you prefer, captions for adult or for children?" is displayed corresponding to the description content of the QText element described between the start tag and the end tag of PDI-Q in FIG. 11.

In addition, below the question, choices for the answer, which are "For adults" and "For children" corresponding to the description content of the Selection element, are displayed.

In the client apparatus, one of the choices can be selected by the end user who sees the question. That is, a PDI-A (client side PDI-A) is generated according to the result of selection of a choice for the answer to the question by the end user.

In addition, also on the provider side, the interactive screen illustrated in FIG. 12 is displayed, and a PDI-A (provider side PDI-A) is generated according to the result of selection of a choice for the answer to the question by the provider (provider of content).

(Description Example of PDI-A)

FIG. 13 is a diagram illustrating a description example of the PDI-A.

In FIG. 13, a Q element, a QText element, a Selection element, and an A element are described between the start tag and the end tag of the QSA element, so that a question asking for an answer candidate selection type answer and the answer are defined.

That is, the PDI-A in FIG. 13 is different from the PDI-Q in FIG. 11 in that the A element is added. "2" is designated as the answer attribute of the A element. The value of the answer attribute corresponds to the value of the selectionId attribute of the Selection element.

That is, in the description example of the PDI-A illustrated in FIG. 13, a case is shown in which "For children" is selected from the choices for the answer to the question "Which do you prefer, captions for adult or for children?", which are "For adults" and "For children", on the interactive screen illustrated in FIG. 12.

(Content Filtering Processing)

In the client apparatus, content filtering processing is performed according to the result of matching processing between the PDI-A (client side PDI-A) corresponding to the answer set by the end user and the PDI-A (provider side PDI-A) corresponding to the answer set by the provider (provider of content).

In addition, the provider side PDI-A is delivered in a state in which the provider side PDI-A is included in metadata (MPD metadata, ESG information, or the like to be described later) of the content to be delivered.

For example, in a case where the PDI-A illustrated in FIG. 13 is generated as the client side PDI-A in the client apparatus, it is assumed that, when metadata delivered from the transmission server is received, the PDI-A (provider side PDI-A) illustrated in FIG. 14 is included in the metadata.

Here, the PDI-A (provider side PDI-A) in A of FIG. 14 shows a case where "For children" is selected from the choices for the answer to the question on the interactive screen illustrated in FIG. 12. On the other hand, the PDI-A (provider side PDI-A) in B of FIG. 14 shows a case where "For adults" is selected from the choices for the answer to the question on the interactive screen illustrated in FIG. 12.

Then, in a case where the provider side PDI-A in A of FIG. 14 is included in the metadata of delivered content, the client apparatus determines that the provider side PDI-A and the client side PDI-A match each other (selection items match each other as "For children") and selects the content.

Then, in a case where the provider side PDI-A in B of FIG. 14 is included in the metadata of delivered content, the client apparatus determines that the provider side PDI-A and the client side PDI-A do not match each other (selection items do not match each other as "For adults" and "For children") and does not select the content.

That is, in the case of PDI-A with respect to the PDI-Q of the answer candidate selection type (selection type), content filtering is performed in order to acquire content to which PDI-A (provider side PDI-A), which satisfies at least one selected selection item indicated by PDI-A (client side PDI-A) set in a content filter on the client apparatus side, is assigned.

(Overall Image of PDI)

Figure 15:
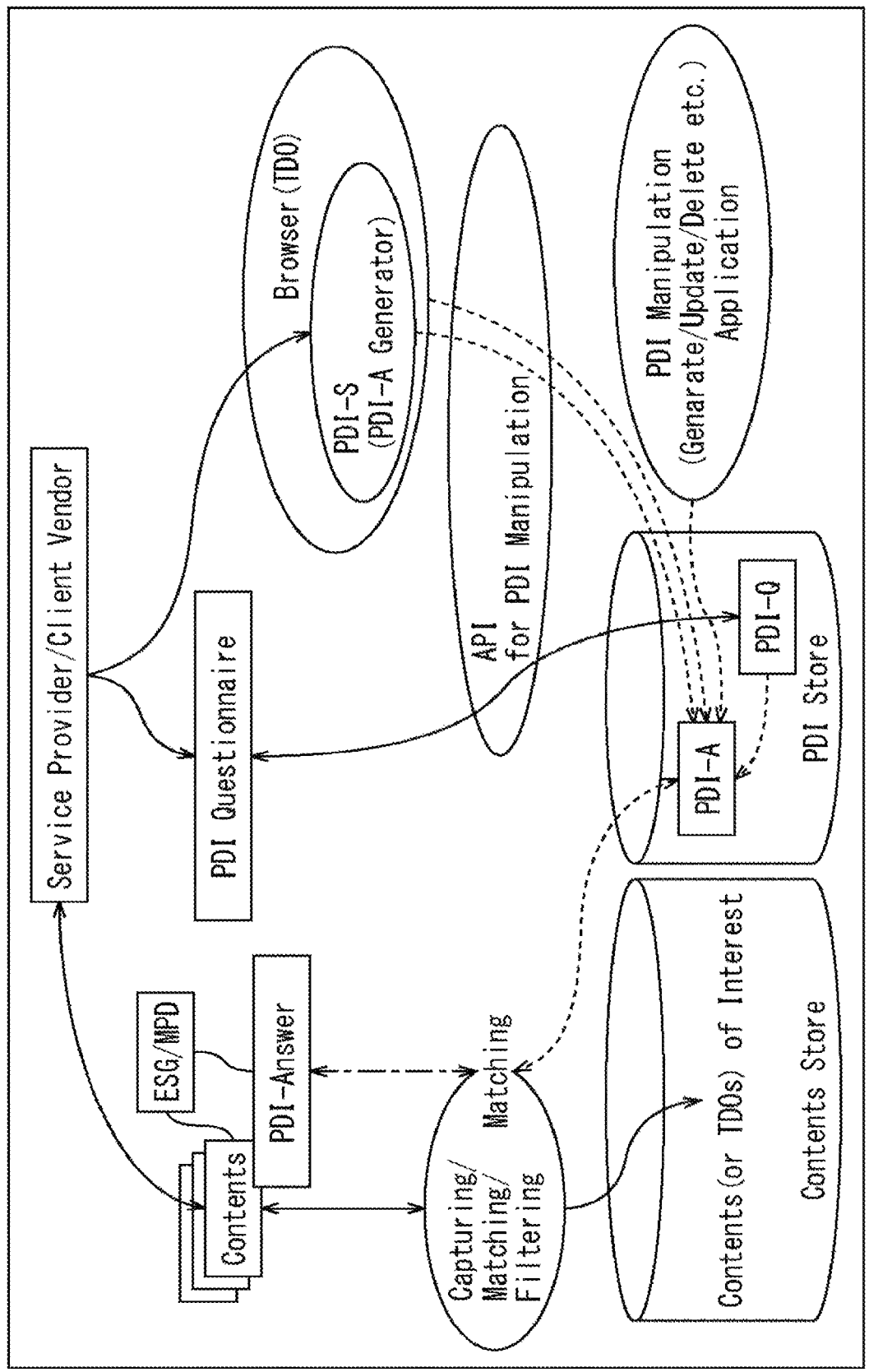
FIG. 15 is a diagram illustrating an overall example of PDI.

The above is summarized as illustrated in FIG. 15. FIG. 15 is a diagram illustrating an overall image of the PDI.

As illustrated in FIG. 15, in the provider server, a PDI-Q that is information indicating a question about the preferences of a user who uses a client apparatus and a PDI-A (provider side PDI-A) that is information indicating an answer set by the provider for the question about the preferences of the user are generated and transmitted to the client apparatus.

In addition, although details will be described later, the provider side PDI-A can be transmitted in a state in which the provider side PDI-A is included in MPD metadata or ESG information transmitted together with the content.

On the other hand, when the PDI-Q is received, a PDI-A (client side PDI-A) that is information indicating the user's answer to the question of PDI-Q is generated and stored in the client apparatus.

Then, when the content delivered from the provider is received, the client apparatus performs matching processing between the provider side PDI-A from the provider and the stored client side PDI-A, so that only the content for which the provider side PDI-A and the stored client side PDI-A match each other is reproduced (or recorded).

As a variation of the parameter as a selection criterion when selecting the optimal content as described above, there is a dynamic metadata mechanism that expresses end user preferences and the like, the dynamic metadata mechanism including a question to the end user and an answer to the question called PDI adopted in ATSC2.0.

Then, also in the broadcasting method, such as ATSC3.0, it is expected that content according to the preferences of the end user can be provided by adopting the PDI.

Therefore, in the present technology, by making it possible to store reference information, such as an application for generating the PDI-A, and the like in the definition of a service (PDI delivery service) for transmitting the instance of the PDI-Q, which is a format for delivering metadata (content metadata) generated by the metadata mechanism, and control information (signaling) thereof and the format or the control information (signaling) of the service by interaction with the end user after delivery, it is possible to provide the content according to the preferences of the end user.

3. PDI Correspondence Processing (1) First PDI Processing Method

In the first PDI processing method, in a case where a PDI-Q instance is generated or a PDI-Q instance once delivered is updated or deleted on the provider (broadcasting station) side, a PDI-Q delivery service (PDI delivery service) is declared for the PDI-Q instance that has been generated, updated, or deleted, and transmitted therefrom.

On the other hand, in the client apparatus 20, the PDI processing system (PDI client 241) of the native module 221 monitors the ESG information or the SLT metadata and detects and receives the delivery of the PDI delivery service. In this case, since the generation, update, or deletion of the PDI-Q can be detected and received on the client apparatus 20 side, the preference setting based on the latest PDI is possible. Therefore, the accuracy of the content filtering processing is guaranteed.

In addition, in the client apparatus 20, not only does the PDI client 241 of the native module 221 generates the PDI-A based on the PDI-Q, but also the PDI-S application as a Web application can generate a corresponding PDI-A by processing the PDI-Q and store the PDI-A in the PDI store 261.

That is, in the client apparatus 20, as a method of generating the PDI-A and storing the PDI-A in the PDI store 261, there are the following two patterns.

As the first pattern, the PDI client 241 of the native module 221 analogizes the preferences of the end user by directly parsing the PDI-Q and performing necessary interaction with the end user or referring to the viewing history information of the end user or the like, generates a corresponding PDI-A, and stores the generated PDI-A in the PDI store 261.

Hereinafter, this first pattern is referred to as pattern 1. In addition, the details of the PDI correspondence processing of the pattern 1 will be described later with reference to the flowchart illustrated in FIG. 26.

As the second pattern, the PDI client 241 of the native module 221 activates the PDI-S application, which serves as a Web application given in notification at the same time as the delivery of the PDI-Q, on the browser 209.

Then, the PDI-S application analogizes the preferences of the end user by performing necessary interaction with the end user or by referring to the viewing history information of the end user or the like, generates a corresponding PDI-A, and stores the generated PDI-A in the PDI store 261.

Hereinafter, this second pattern is referred to as pattern 2. In addition, the details of the PDI correspondence processing of the pattern 2 will be described later with reference to the flowchart illustrated in FIGS. 28 and 29.

(Overall Image of the First PDI Processing Method)

Figure 16:
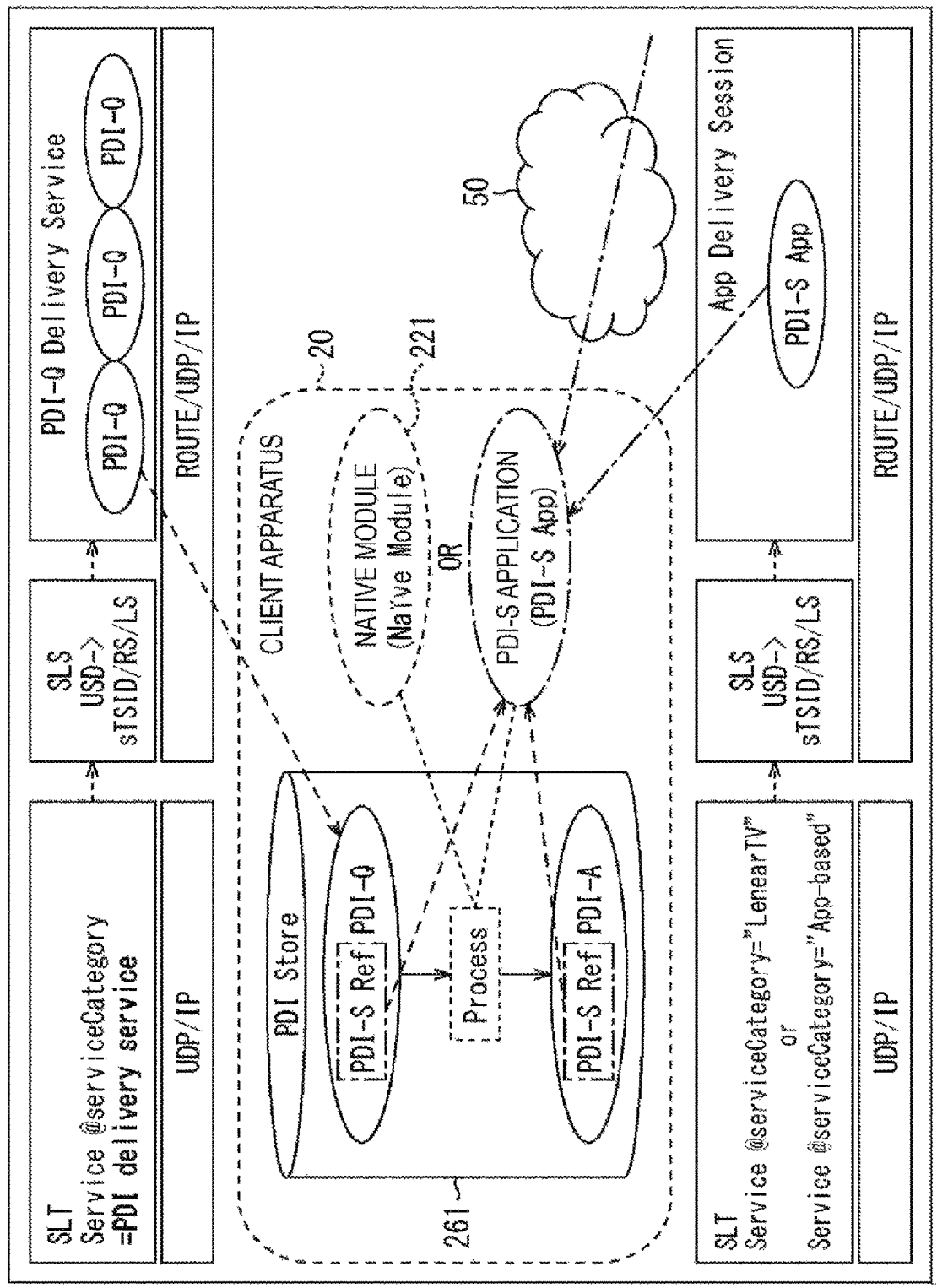
FIG. 16 is a diagram illustrating an overall image of a first PDI processing method.

FIG. 16 is a diagram illustrating an overall image of the first PDI processing method.

As illustrated in the upper part of FIG. 16, in the ROUTE session of the PDI-Q delivery service (PDI delivery service) in which serviceCategory="PDI delivery service" is designated as the serviceCategory attribute of the Service element of the SLT metadata, the file of the PDI-Q is transmitted.

In addition, as illustrated in the lower part of FIG. 16, in the ROUTE session of the App delivery service in which serviceCategory="Linear TV" or "App-based" is designated as the serviceCategory attribute of the Service element of the SLT metadata, the file of the PDI-S application is transmitted.

Here, in a case where the client apparatus 20 performs PDI correspondence processing of the pattern 1, the broadcast middleware 205 acquires a PDI-Q delivered in the ROUTE session of the PDI delivery service and stores the PDI-Q in the PDI store 261.

Thereafter, the native module 221 (PDI client 241 thereof) generates a corresponding PDI-A (client side PDI-A) by directly parsing the PDI-Q stored in the PDI store 261 and performing necessary interaction with the end user, for example, through the interactive screen illustrated in FIG. 12 or the like. The generated PDI-A (client side PDI-A) is stored in the PDI store 261.

On the other hand, in a case where the client apparatus 20 performs PDI correspondence processing of the pattern 2, the broadcast middleware 205 acquires a PDI-Q delivered in the ROUTE session of the PDI delivery service and stores the PDI-Q in the PDI store 261.

Thereafter, according to the reference information (PDI-S Ref: URL of the reference destination of the PDI-S application) described in the PDI-Q stored in the PDI store 261, the native module 221 (PDI client 241 thereof) acquires the PDI-S application delivered by the App delivery service and activates the PDI-S application on the browser 209. In addition, here, in addition to the PDI-S application that is broadcast-delivered, a PDI-S application that is communication-delivered through the Internet 50 may be acquired.

Then, on the basis of the PDI-Q, the PDI-S application executed on the browser 209 performs necessary interaction with the end user, for example, through the interactive screen illustrated in FIG. 12 or the like, so that a corresponding PDI-A (client side PDI-A) is generated. The generated PDI-A (client side PDI-A) is stored in the PDI store 261.

In the present technology, in order to realize the PDI correspondence processing of the pattern 1 and the pattern 2, the delivery information indicating that the PDI delivery service is delivered and the reference information indicating the reference destination of the PDI-S application are defined. Therefore, in the following description, the details of the delivery information and the reference information will be described first, and then the details of the PDI correspondence processing of the pattern 1 and the pattern 2 will be described.

In addition, although a case where the delivery information indicating that the PDI delivery service is delivered is included in the SLT metadata is exemplified in the example illustrated in FIG. 16, the delivery information can be included in the ESG information or the like.

In addition, although a case where the reference information (PDI-S Ref) indicating the reference destination of the PDI-S application is described in the referredByAppUrl attribute of the PDI-Q as shown in the PDI schema of FIG. 8 is exemplified in the example illustrated in FIG. 16, the reference information can also be delivered by extending the EFDT parameter or extending the HTTP header.

In addition, in the following description, a broadcasting station will be described as an example of the provider. However, for example, the provider may be other entities, such as a personalization service provider.

(1-1) Delivery Method of Delivery Information

Next, a delivery method of delivery information will be described. In the first PDI delivery method, delivery information can be delivered, for example, by extending the LLS or extending the ESG information.

(Delivery of Delivery Information Using Extension of LLS)

In the SLT metadata that is one of the LLS, a serviceCategory attribute indicating the type of service is defined (refer to Non-Patent Document 3 below).

Non-Patent Document 3: ATSC Candidate Standard: Signaling, Delivery, Synchronization, and Error Protection (A/331)

FIG. 17 illustrates an example of the value of the serviceCategory attribute arranged in the service loop of the SLT metadata.

As illustrated in FIG. 17, for example, it is possible to designate the type of service, such as a normal broadcasting service (1: Linear A/V service) or an audio only service (2: Linear audio only service), using the serviceCategory attribute. In addition, the audio only service corresponds to the current radio broadcasting.

As defined in "Table 6.4 Code Values for SLT.Service@serviceCategory" of Non-Patent Document 3 described above, values of 0 to 5 and Other values are defined as the serviceCategory attribute.

In the first PDI processing method, "6" is newly defined as the value of the serviceCategory attribute so as to mean the PDI delivery service. That is, here, delivery information indicating that the PDI delivery service is delivered can be included in the SLT metadata by adding and extending the attribute value instead of adding an element or an attribute.

FIG. 18 illustrates a description example of SLT metadata. For example, in a case where the offloading service (PDI delivery service) is available between 13:00 and 15:00 on Sep. 12, 2016, one of the Service elements of the SLT metadata in this time period, ServiceCategory="6" is designated as the value of the serviceCategory attribute. That is, during the period from 13:00 to 15:00 on Sep. 12, 2016, the SLT metadata is delivered.

(Delivery of Delivery Information Using Extension of ESG)

The ESG service is an electronic service guide (electronic program guide) defined by the open mobile alliance (OMA) that is an organization that formulates standards for mobile phones. However, also in ATSC3.0, using the program information (ESG) conforming to the OMA-ESG is assumed (refer to Non-Patent Document 4 below).

Non-Patent Document 4: ATSC Candidate Standard: Service Announcement (A/332)

As illustrated in FIG. 19, in the program information (ESG) of ATSC3.0, there is an element called ServiceType indicating the type of service, such as a normal broadcasting service (Liner service), radio broadcasting (Linear audio only service), or an App-based service (app-based enhancement service).

In addition, when the ServiceType element of the ESG is compared with the serviceCategory attribute of the SLT metadata, the normal broadcasting service of the ESG corresponds to the normal broadcasting service (1: Linear A/V service) defined by the SLT metadata, and the radio broadcasting of the ESG corresponds to the audio only service (2: Linear audio only service) defined by the SLT metadata. In addition, the App-based service of the ESG corresponds to the App-based service (3: App-based service) defined by the SLT metadata.

That is, as the ServiceType element of the ESG, values defined in "5.2.2.1.1 Service Type" of Non-Patent Document 4 are defined.

In the first PDI processing method, as illustrated in FIG. 19, "230" is newly defined as the value of the ServiceType element so as to mean the PDI delivery service. That is, here, delivery information indicating that the PDI delivery service is delivered can be included in the ESG information by adding and extending the value stored as the content of an element instead of adding an element or an attribute.

FIG. 20 illustrates a description example of ESG information. As illustrated in FIG. 20, in the service fragment of the ESG information, ServiceType="230" is designated as the value of the ServiceType element, which indicates that the target service is the PDI delivery service.

In addition, for example, in a case where the PDI delivery service is available in a time period from 13:00 to 15:00 on Sep. 12, 2016, it is possible to provide notification of the effective period of the PDI delivery service in advance using an XML fragment, such as a content fragment or a schedule fragment, in the ESG information in addition to the service fragment illustrated in FIG. 20. Specific examples thereof are illustrated in FIGS. 21 and 22.

(Relationship of XML Fragments)

Figure 21:
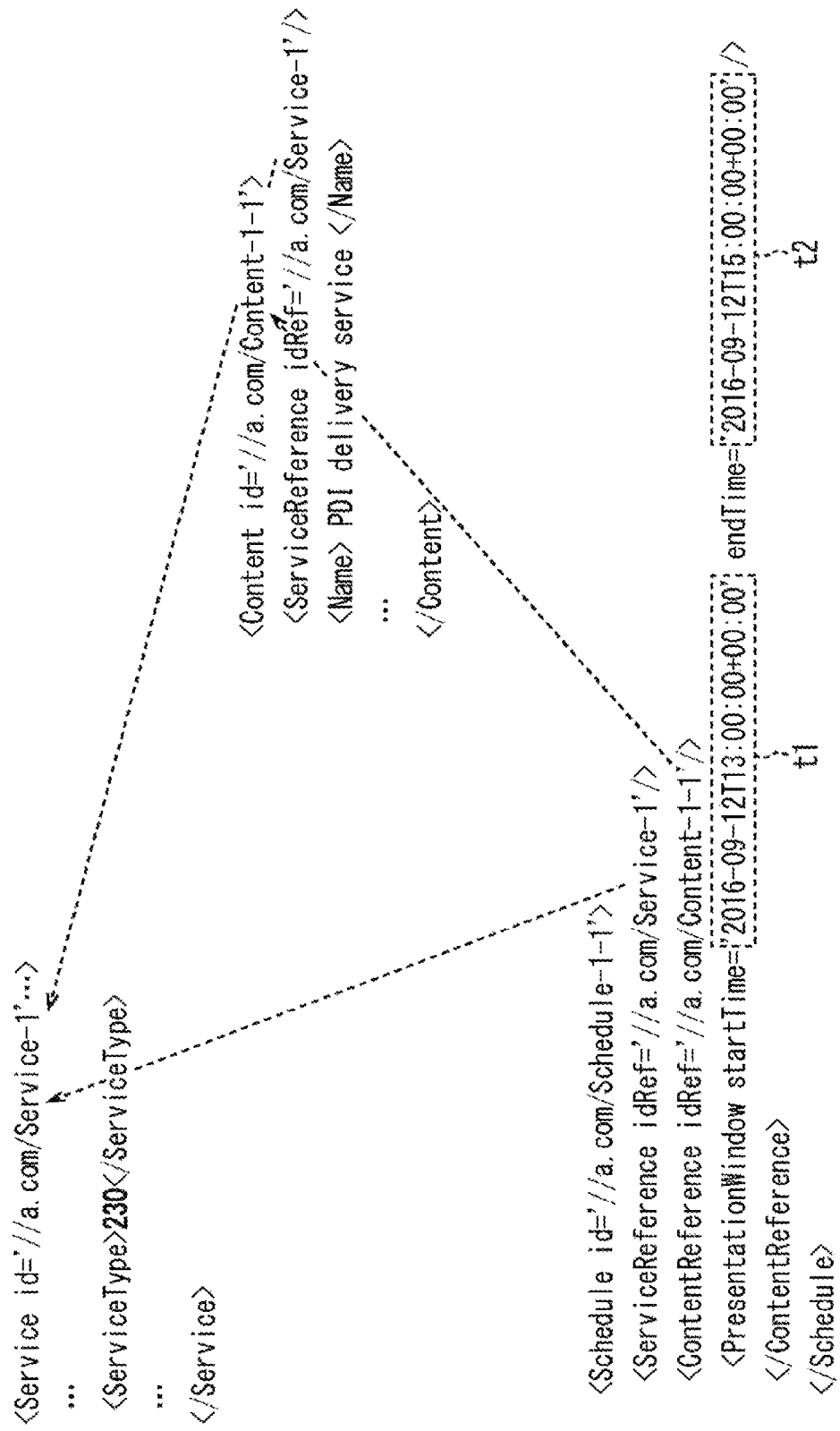
FIG. 21 is a diagram illustrating a relationship of XML fragments in a case where a PDI delivery service is available.
Figure 22:
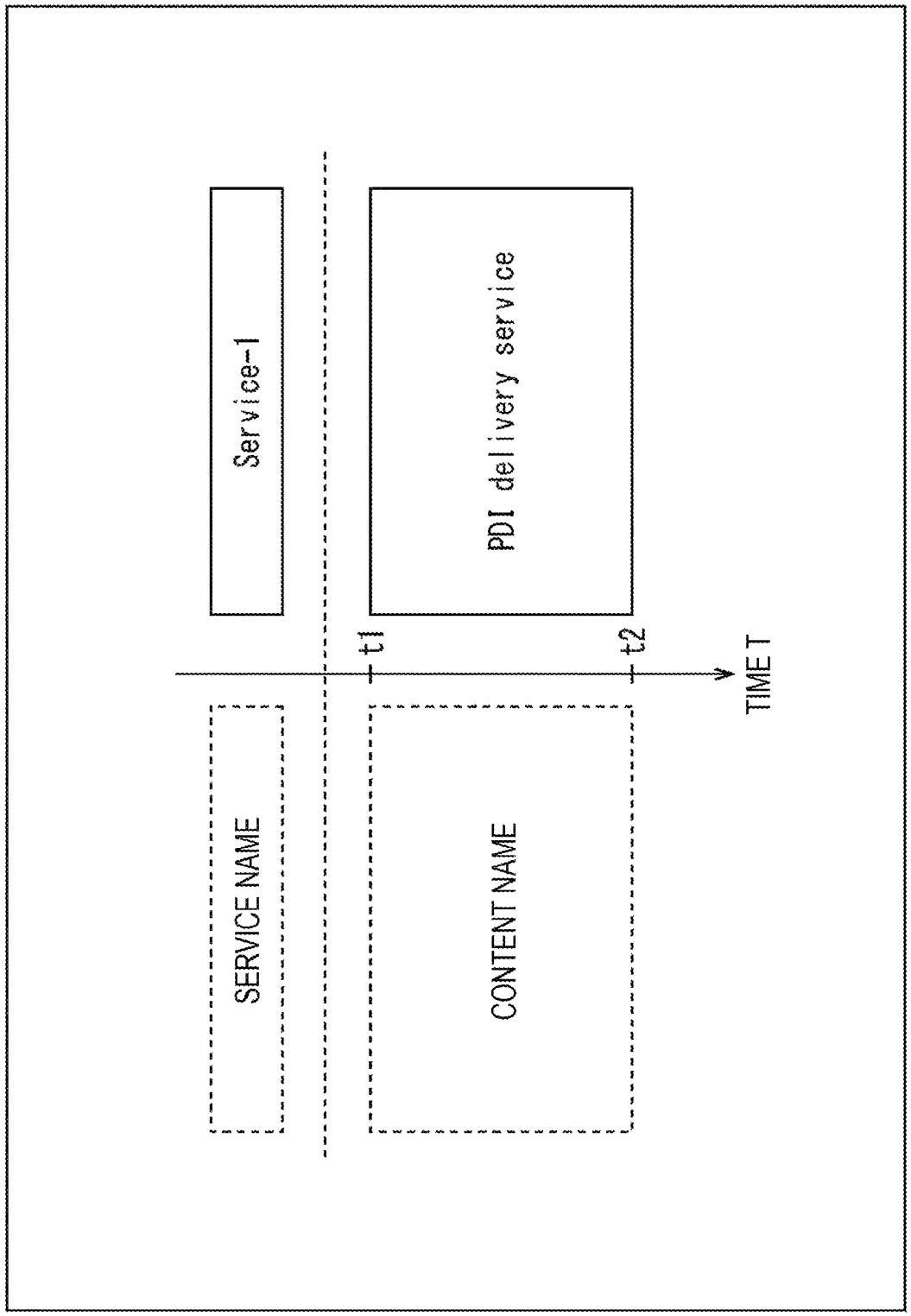
FIG. 22 is a diagram illustrating a display example of an ESG service screen.

FIG. 21 is a diagram illustrating a relationship among XML fragments of service, content, and schedule in a case where the PDI delivery service is available during a certain time period.

The service fragment is identified by the ID "//a.com/Service-1", and ServiceType="230" is designated as a value of the ServiceType element. That is, this indicates that the service (service-1) is a PDI delivery service.

The content fragment is identified by the ID "//a.com/Content-1-1", and "PDI delivery service" is designated as a Name element. That is, the name of the content is a PDI delivery service.

In addition, in FIG. 21, the content fragment is associated with the service fragment by the value of the idRef attribute of the ServiceReference element.

The schedule fragment is identified by the ID "//a.com/Schedule-1-1", "2016-09-12T13:00:00+00:00" is designated as the startTime attribute of the PresentationWindow element that is a child element of the ContentReferenceelement, and "2016-09-12T15:00:00+00:00" is designated as the endTime attribute.

That is, a start time t1 and an end time t2 of the PDI delivery service are designated by the startTime attribute and the endTime attribute. In the case of this example, the PDI delivery service is delivered between 13:00 and 15:00 on Sep. 12, 2016.

In addition, in FIG. 21, the schedule fragment is associated with the service fragment by the value of the idRef attribute of the ServiceReference element. In addition, the schedule fragment is associated with the content fragment by the value of the idRef attribute of the ContentReference element.

(Example of an ESG Service Screen)

FIG. 22 is a diagram illustrating a display example of an ESG service screen in a case where the PDI delivery service is available.

The ESG service screen illustrated in FIG. 22 is a display example of a screen displayed on the client apparatus 20 that receives the ESG information including the XML fragment illustrated in FIG. 21.

That is, on the ESG service screen, within the frame of a time period from the start time t1 (13:00 on Sep. 12, 2016) to the end time t2 (15:00 on Sep. 12, 2016), a PDI delivery service is displayed as Service-1. With this arrangement, it is possible to notify (inform) the end user in advance that the PDI delivery service is delivered during the time period.

However, whether or not to display the delivery of the PDI delivery service on the ESG service screen depends on the implementation of the user interface (UI) of the client apparatus 20. Therefore, for example, depending on the client apparatus 20, there is also a case where the PDI-Q is acquired by independent determination of the PDI processing system (PDI client 241) of the client apparatus 20 without presenting the delivery of the PDI delivery service to the end user and is updated to a latest PDI-Q.

In addition, in the first PDI delivery method, the delivery information may be delivered by at least one of the delivery information delivery methods using the extension of the LLS and the extension of the ESG. In addition, the delivery information may be delivered by delivery methods other than the delivery information delivery methods using the extension of the LLS and the extension of the ESG.

(1-2) Delivery Method of Reference Information

Next, a delivery method of reference information will be described. In the first PDI delivery method, reference information can be delivered, for example, by extending the EFDT parameter or extending the HTTP header.

In addition, delivery modes of the ROUTE session include file mode (FileMode) delivery and entity mode (EntityMode) delivery, and each delivery mode has a different reference information arrangement method. Here, the file mode delivery is a mode in which the file itself is delivered. In addition, the entity mode delivery is a mode in which a file to which an HTTP header (Entity header) is added is delivered.

(Delivery of Reference Information Using Extension of an EFDT Parameter)

Figure 23:
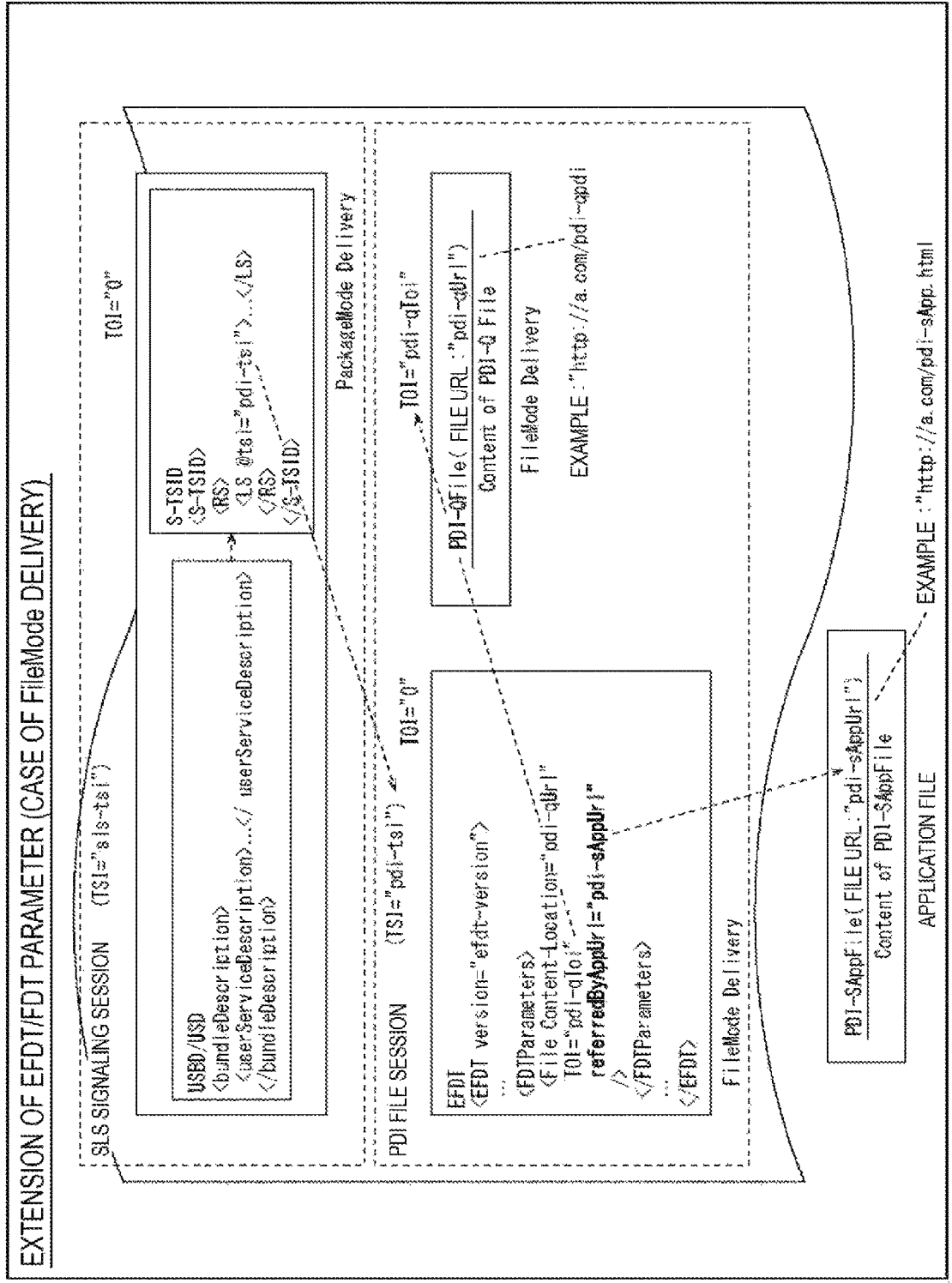
FIG. 23 is a diagram illustrating an example when extending an EFDT parameter in the case of file mode delivery.

FIG. 23 is a diagram illustrating an example when extending the EFDT parameter in the case of file mode delivery.

FIG. 23 illustrates a relationship at the time of file mode delivery among the SLS carried in the SLS signaling session, the PDI-Q carried in the PDI file session, and the PDI-S application that is delivered independently of the ROUTE sessions.

In addition, the SLS signaling session (TSI="sls-tsi") is delivered in the package mode, and the PDI file session (TSI="pdi-tsi") is delivered in the file mode. In addition, the PDI-S application is broadcast-delivered or communication-delivered.

In the SLS signaling session, a USD fragment (USBD metadata) and an S-TSID fragment (S-TSID metadata) that are identified by specific TOI (TOI="0") are transmitted. By acquiring the USD fragment, it is possible to refer to the S-TSID fragment.

In the S-TSID fragment, tsi="pdi-tsi" is designated as the value of the tsi attribute of the LS element, but the PDI file session is referred to by the value of the tsi attribute. In the PDI file session, the EFDT and the file of the PDI-Q are transmitted. Here, the EFDT is identified by specific TOI (TOI="0").

In the first PDI delivery method, a referredByAppUrl attribute is newly defined in parallel with a Content-Location attribute, which designates the file URL of the PDI-Q instance file, in a File element that is a child element of the FDTParameters element of the EFDT. Then, according to the referredByAppUrl attribute, the URL (EntryLocationUrl) of the PDI-S application to be processed with reference to the PDI-Q instance file is designated. That is, the URL designated as the value of the referredByAppUrl attribute of the EFDT is the reference information (PDI-S Ref).

The client apparatus 20 can acquire the file (PDI-S AppFile) of the PDI-S application delivered from the broadcast server 106 or the communication server 107 on the basis of the URL (pdi-sAppUrl) obtained from the EFDT. Then, in the client apparatus 20, the PDI-S application is activated to process the file of the PDI-Q.

In addition, in the PDI file session, TOI="pdi-qToi" is designated as the value of the TOI attribute of the File element of the FDTParameters element of the EFDT, but the file (PDI-S File) of the PDI-Q is referred to and acquired by the value of the TOI attribute. In addition, in the ROUTE session, data can be identified by two pieces of identification information of a transport session identifier (TSI) and a transport object identifier (TOI).

(Example of an EFDT Schema)

Figure 24:
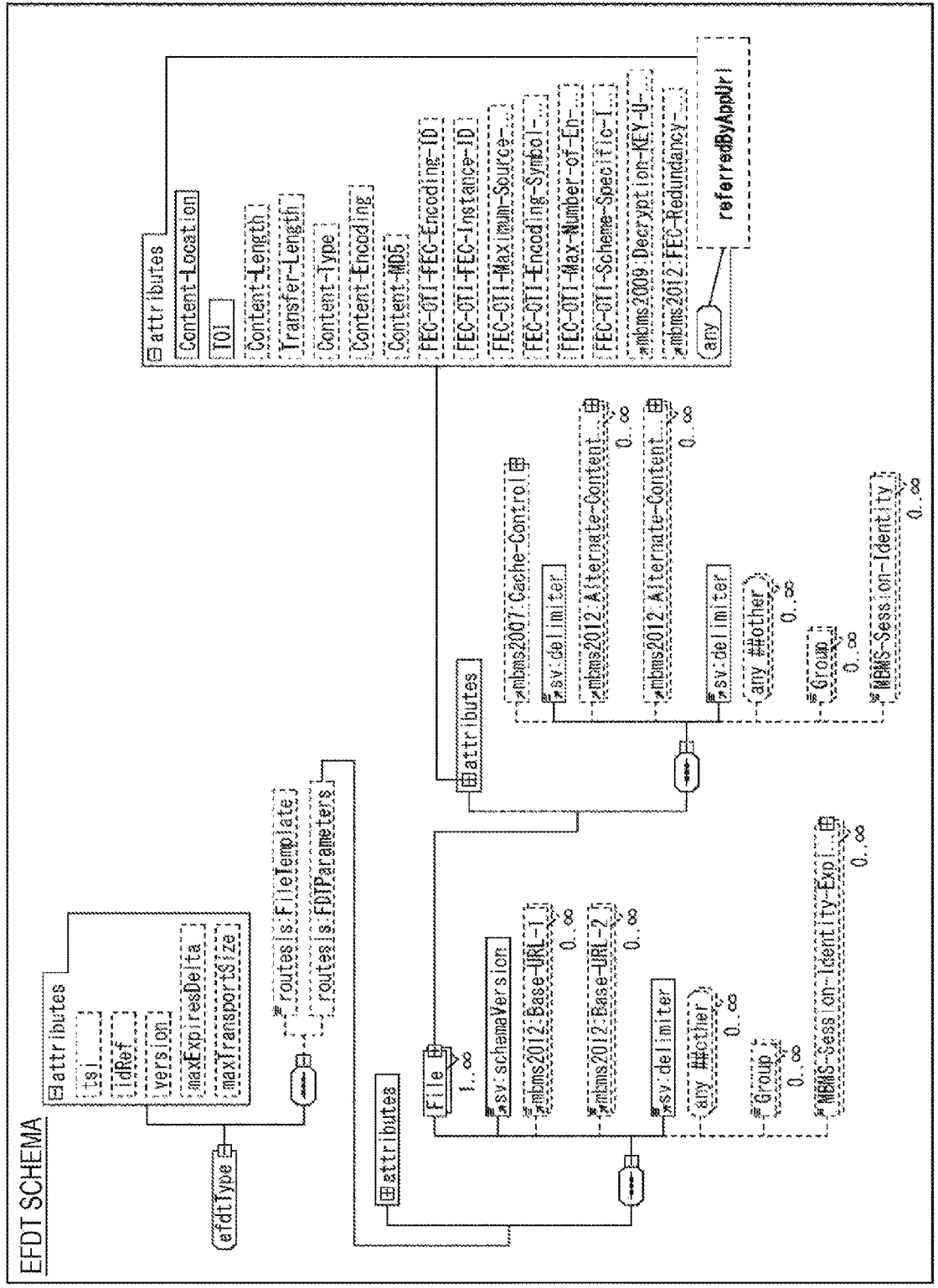
FIG. 24 is a diagram illustrating an example of an extended EFDT schema.

FIG. 24 is a diagram illustrating an example of the extended EFDT schema.

In FIG. 24, the referredByAppUrl attribute is added to the File element that is a child element of the FDTParameters element, so that the EFDT is extended. As illustrated in FIG. 24, the referredByAppUrl attribute is defined in parallel with the Content-Location attribute designating the file URL of the PDI-Q instance file.

In addition, the structure of the EFDT schema illustrated in FIG. 24 is an example, and other structures may be adopted.

(Delivery of Reference Information Using Extension of an HTTP Header)

Figure 25:
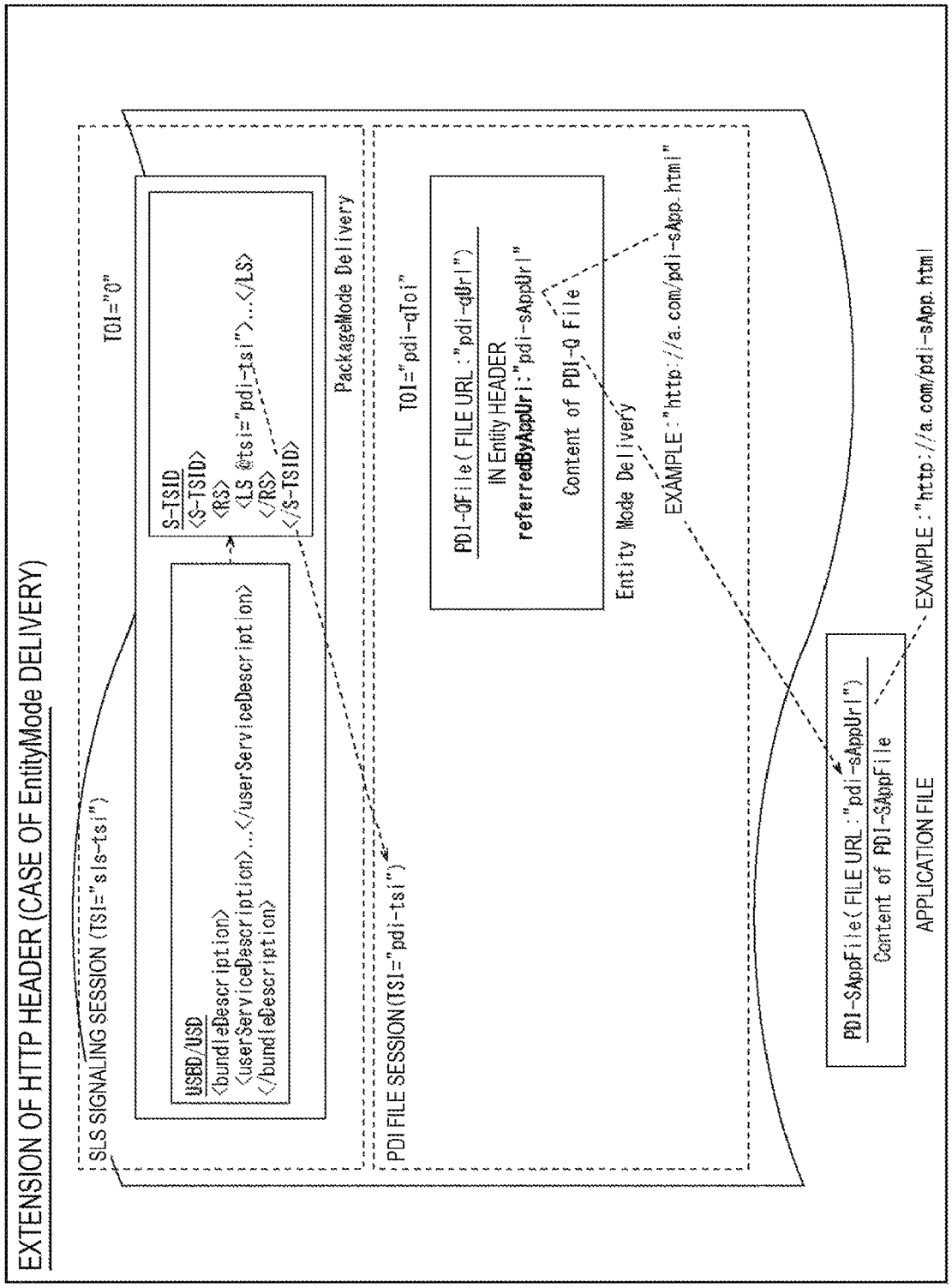
FIG. 25 is a diagram illustrating an example when extending an HTTP header in the case of entity mode delivery.

FIG. 25 is a diagram illustrating an example when extending the HTTP header in the case of entity mode delivery.

FIG. 25 illustrates a relationship at the time of entity mode delivery among the SLS carried in the SLS signaling session, the PDI-Q carried in the PDI file session, and the PDI-S application that is delivered independently of the ROUTE sessions.

In addition, the SLS signaling session (TSI="sls-tsi") is delivered in the package mode, and the PDI file session (TSI="pdi-tsi") is delivered in the file mode. In addition, the PDI-S application is broadcast-delivered or communication-delivered.

In the SLS signaling session, a USD fragment (USED metadata) and an S-TSID fragment (S-TSID metadata) that are identified by specific TOI (TOI="0") are transmitted. By acquiring the USD fragment, it is possible to refer to the S-TSID fragment.

In the S-TSID fragment, tsi="pdi-tsi" is designated as the value of the tsi attribute of the LS element, but the PDI file session is referred to by the value of the tsi attribute. In the PDI file session, the file of the PDI-Q is transmitted.

In the first delivery method, a referredByAppUrl header is newly defined as an extension of the HTTP header (Entity header) in the PDI-Q file. Then, according to the referredByAppUrl header, the URL (EntryLocationUrl) of the PDI-S application to be processed with reference to the PDI-Q instance file is designated. That is, the URL designated as the value of the referredByAppUrl header of the HTTP header is the reference information (PDI-S Ref).

The client apparatus 20 can acquire the file (PDI-S AppFile) of the PDI-S application delivered from the broadcast server 106 or the communication server 107 on the basis of the URL (pdi-sAppUrl) obtained from the referredByAppUrl header. Then, in the client apparatus 20, the PDI-S application is activated to process the file of the PDI-Q.

In addition, in the first PDI delivery method, the reference information may be delivered by at least one of the delivery information delivery methods using the extension of the EFDT parameter and the extension of the HTTP header.

In addition, the reference information may be delivered by delivery methods other than the reference information delivery methods using the extension of the EFDT parameter and the extension of the HTTP header. For example, although not described in detail herein, the URL of the reference destination of the PDI-S application may be directly written in the referredByAppUrl attribute of the PDI-Q, as illustrated in the PDI schema of FIG. 8 described above.

(1-3) PDI Correspondence Processing of Pattern 1

(Flow of PDI Correspondence Processing of Pattern 1)

First, with reference to the flowchart illustrated in FIG. 26, the flow of PDI correspondence processing executed by each of the transmission side apparatus and the reception side apparatus in the case of the first PDI processing method (pattern 1) will be described.

Figure 26:
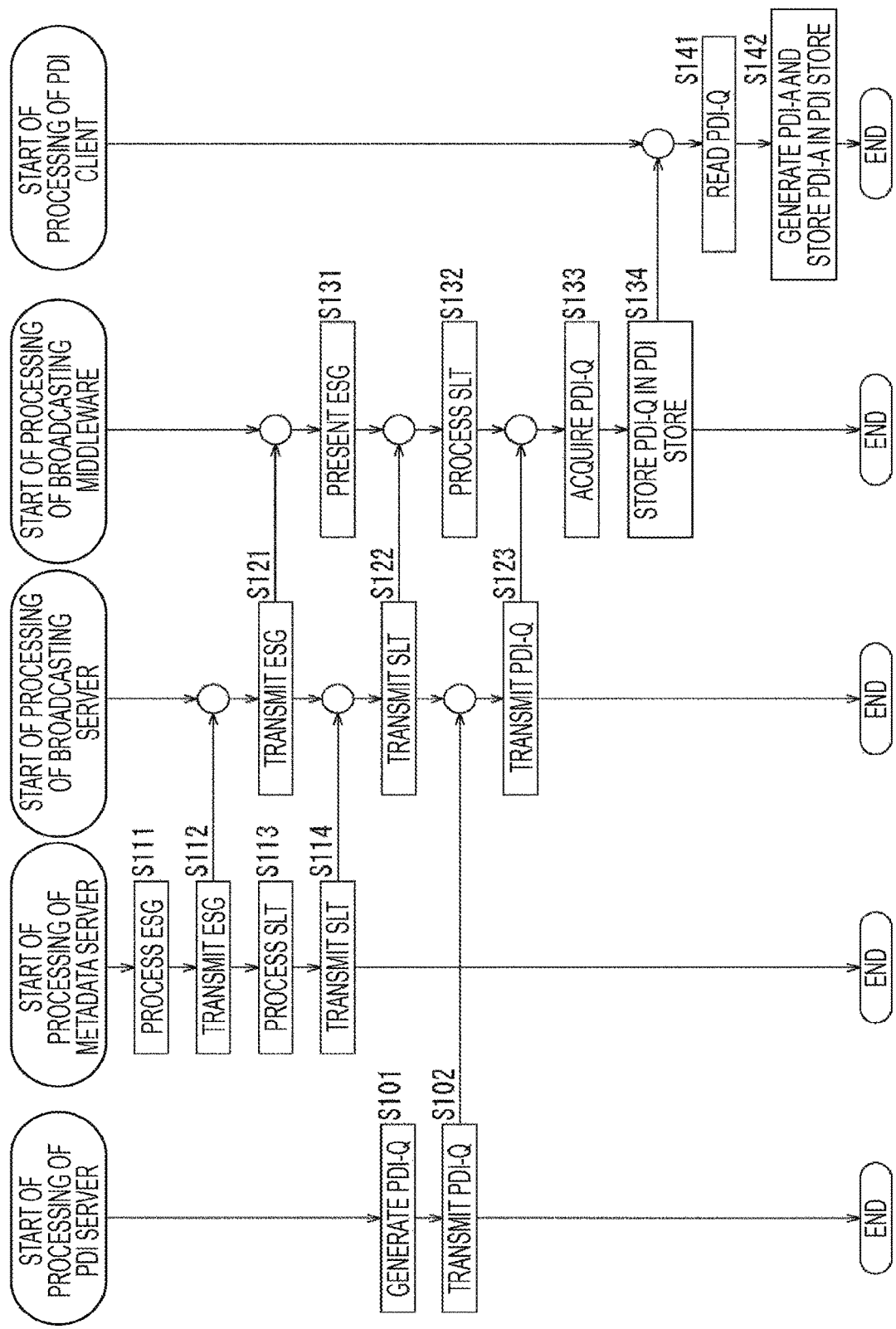
FIG. 26 is a flowchart for describing the flow of PDI correspondence processing executed by each of a transmission side apparatus and a reception side apparatus in the case of first PDI processing method (pattern 1).

In addition, in FIG. 26, the processes of steps S101 and S102, S111 to S114, and S121 to S123 are executed by the PDI server 102, the metadata server 104, and the broadcast server 106 of the transmission side system 10, respectively. On the other hand, the processes of steps S131 to S133 and S141 and S142 are executed by the broadcast middleware 205 and the PDI client 241 (of the native module 221) of the client apparatus 20.

In step S111, the ESG processing unit 141 processes ESG information generated by the ESG server 103. The ESG information processed in step S111 is transmitted to the broadcast server 106 (S112). In step S121, the transmission unit 161 transmits the ESG information from the metadata server 104.

Here, in a case where the PDI-Q is scheduled to be delivered from the transmission side system 10, it is possible to notify in advance that the target service to be delivered is the PDI delivery service by describing "PDI delivery service" as the ServiceType element (delivery information) of the ESG information.

In step S113, the metadata processing unit 142 processes the SLT metadata as the SLS. The SLT metadata processed in step S113 is transmitted to the broadcast server 106 (S114). In step S122, the transmission unit 161 transmits the SLT metadata from the metadata server 104.

Here, in a case where the PDI-Q is delivered from the transmission side system 10, it is possible to notify that the service delivered in the target ROUTE session is the PDI delivery service by describing "PDI delivery service" as the ServiceCategory attribute (delivery information) of the SLT metadata.

However, although it is possible to notify that the PDI delivery service is delivered by designating "PDI delivery service" as delivery information for the ESG information and the SLT metadata, at least one of the ESG information or the SLT metadata may include the delivery information.

For example, the ESG information can be used in the case of notifying in advance that the PDI delivery service is delivered, while the SLT metadata can be used in the case of notifying in real time that the PDI delivery service is delivered.

In step S101, the PDI-Q generator 121 generates a PDI-Q. The PDI-Q generated herein is transmitted to the broadcast server 106 (S102). In step S123, the transmission unit 161 transmits the PDI-Q from the PDI server 102.

On the other hand, in step S131, the broadcast middleware 205 processes the ESG information obtained from the broadcast signal received by the tuner 204, and presents the ESG service screen (FIG. 22) on the display through the output unit 208.

In addition, the presentation of the ESG information is not essential, but the ESG information is presented as necessary in response to the operation of the end user or the like. In addition, in a case where the PDI-Q is scheduled to be delivered from the transmission side system 10, since "PDI delivery service" is described as the ServiceType element of the ESG information, it is possible to recognize that the target service to be delivered is the PDI delivery service (ESG service screen in FIG. 22).

In step S132, the broadcast middleware 205 processes the SLT metadata obtained from the broadcast signal received by the tuner 204.

Here, in a case where the PDI-Q is delivered from the transmission side system 10, since "PDI delivery service" is described as the ServiceCategory attribute of the SLT metadata, the broadcast middleware 205 can specify the ROUTE session, in which the PDI delivery service is delivered, according to the parsing result of the SLT metadata and acquire the PDI-Q (S133).

In step S134, the broadcast middleware 205 stores the PDI-Q acquired from the ROUTE session in the PDI store 261. In addition, in a case where the PDI-Q is already stored in the PDI store 261, it is possible to update the stored PDI-Q to the newly acquired PDI-Q or to delete the stored PDI-Q. That is, here, storage, updating, or deletion of the PDI-Q is performed.

In step S141, the PDI client 241 reads the PDI-Q stored in the PDI store 261. In addition, in step S142, the PDI client 241 generates a PDI-A (client side PDI-A) according to the read PDI-Q, and stores the PDI-A (client side PDI-A) in the PDI store 261.

Here, in a case where the PDI-Q arrives at a timing when the PDI-Q is delivered by the PDI delivery service or at a timing when the end user reproduces and views the main program or the like, the PDI client 241 needs to generate the PDI-A that is the end user's answer to the PDI-Q newly arrived at the end user.

The timing of generating the PDI-A depends on its implementation or user interface (UI), and the implementation can be done as follows, for example.

That is, in the case of generating the PDI-A by waiting for new delivery of a plurality of PDI-Qs, it is possible to perform implementation, such as presenting a list of PDI-Qs as processing candidates on the display so that the end user selects a target for which an answer is to be generated. In addition, at this time, not only a question relevant to the program being reproduced and viewed but also a question having no special relationship with the program may be made.

Figure 27:
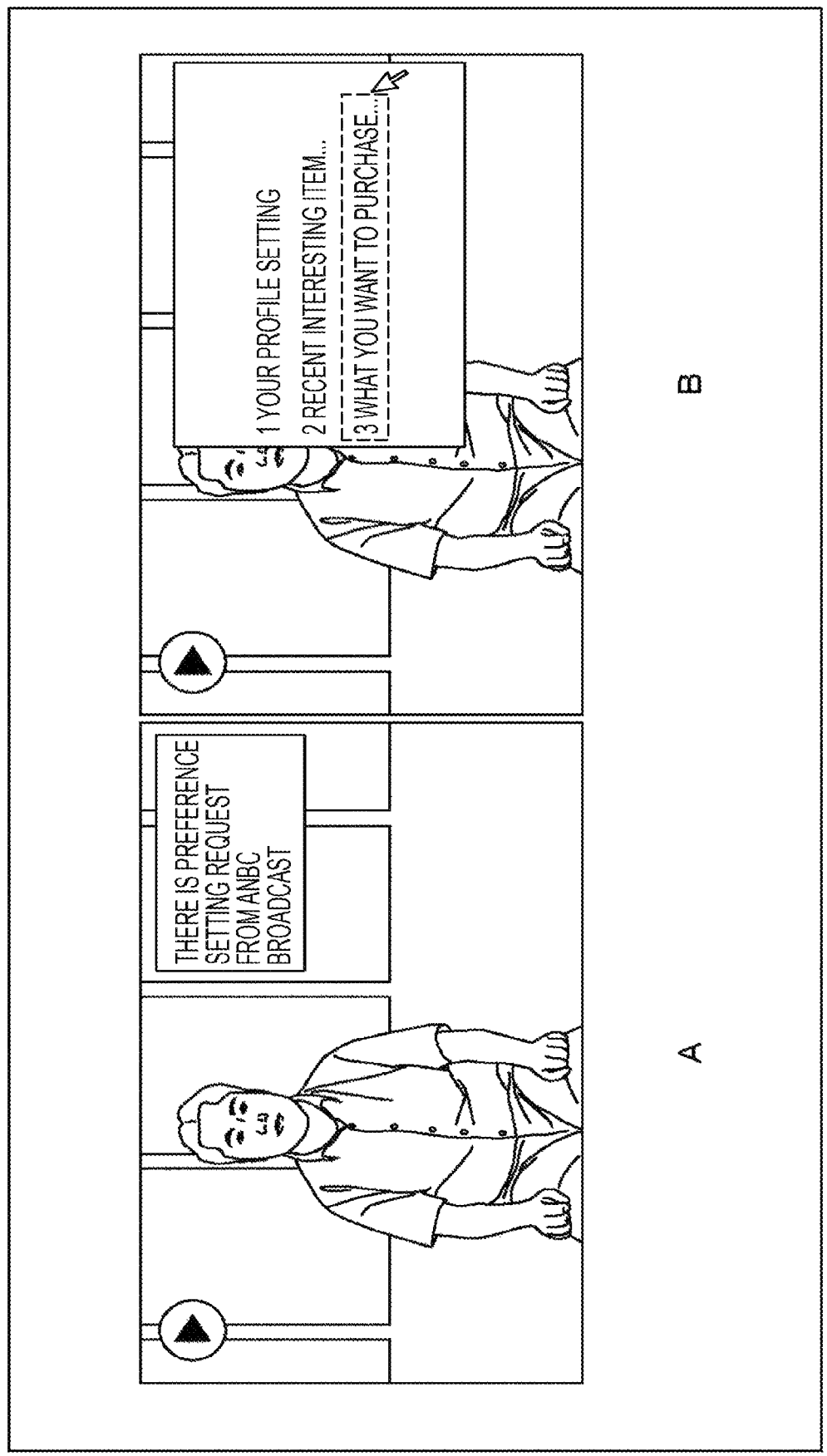
FIG. 27 is a diagram illustrating a display example of a PDI delivery service screen.

Specifically, as illustrated in A of FIG. 27, when a new PDI-Q group is delivered by the PDI delivery service, a screen for prompting the end user to generate a PDI-A is displayed in order to generate anew set of PDI-A. For example, in the example of A of FIG. 27, a message "there is a preference setting request from ANBC broadcast" is displayed.

Then, in a case where the end user generates the PDI-A, as illustrated in B of FIG. 27, an item corresponding to each PDI-Q is extracted from, for example, the character string of the QText element and presented (alternatively, a plurality of character strings may be cut out from the beginning and presented, for example) to prompt the selection of the end user. For example, in the example illustrated in FIG. 27, choices of "1 Your profile setting", "2 Recent interesting item . . . ", and "3 What you want to purchase . . . " are displayed.

In this manner, by displaying an answer to the question defined in the PDI-Q on the display and receiving the input or selection of the end user's answer to the question, the PDI-A (client side PDI-A) corresponding to the input or selection result of the answer is generated and stored in the PDI store 261.

In addition, as the PDI-Q delivered by the PDI delivery service, a new PDI-Q instance may arrive or a new version of the previously delivered PDI-Q instance may arrive. For example, in that case, it is possible to update the PDI-Q stored in the PDI store 261 to a high version or to delete the old version PDI-Q.

In addition, although a case where the PDI client 241 generates the PDI-A by parsing the PDI-Q and performing necessary interaction with the end user has been described herein, the PDI-A may also be generated by analogizing the preferences of the end user with reference to the viewing history information of the end user or the like in the processing of step S142 as described above.

The flow of the PDI correspondence processing of the pattern 1 has been described above.

(1-4) PDI Correspondence Processing of Pattern 2

(Flow of PDI Correspondence Processing of Pattern 2)

Next, with reference to the flowchart illustrated in FIGS. 28 and 29, the flow of PDI correspondence processing executed by each of the transmission side apparatus and the reception side apparatus in the case of the first PDI processing method (pattern 2) will be described.

Figure 28:
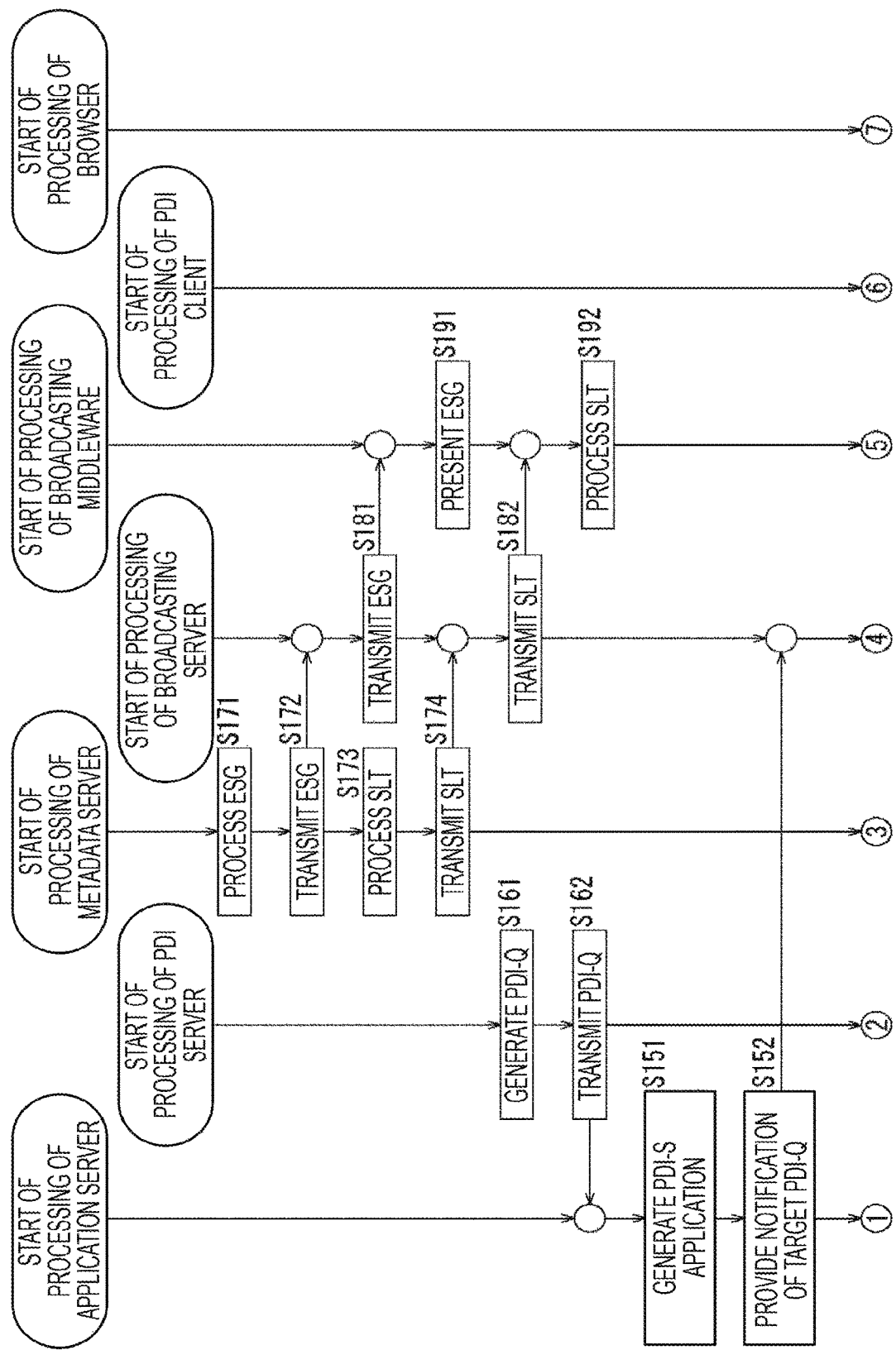
FIG. 28 is a flowchart for describing the flow of PDI correspondence processing executed by each of a transmission side apparatus and a reception side apparatus in the case of first PDI processing method (pattern 2).
Figure 29:
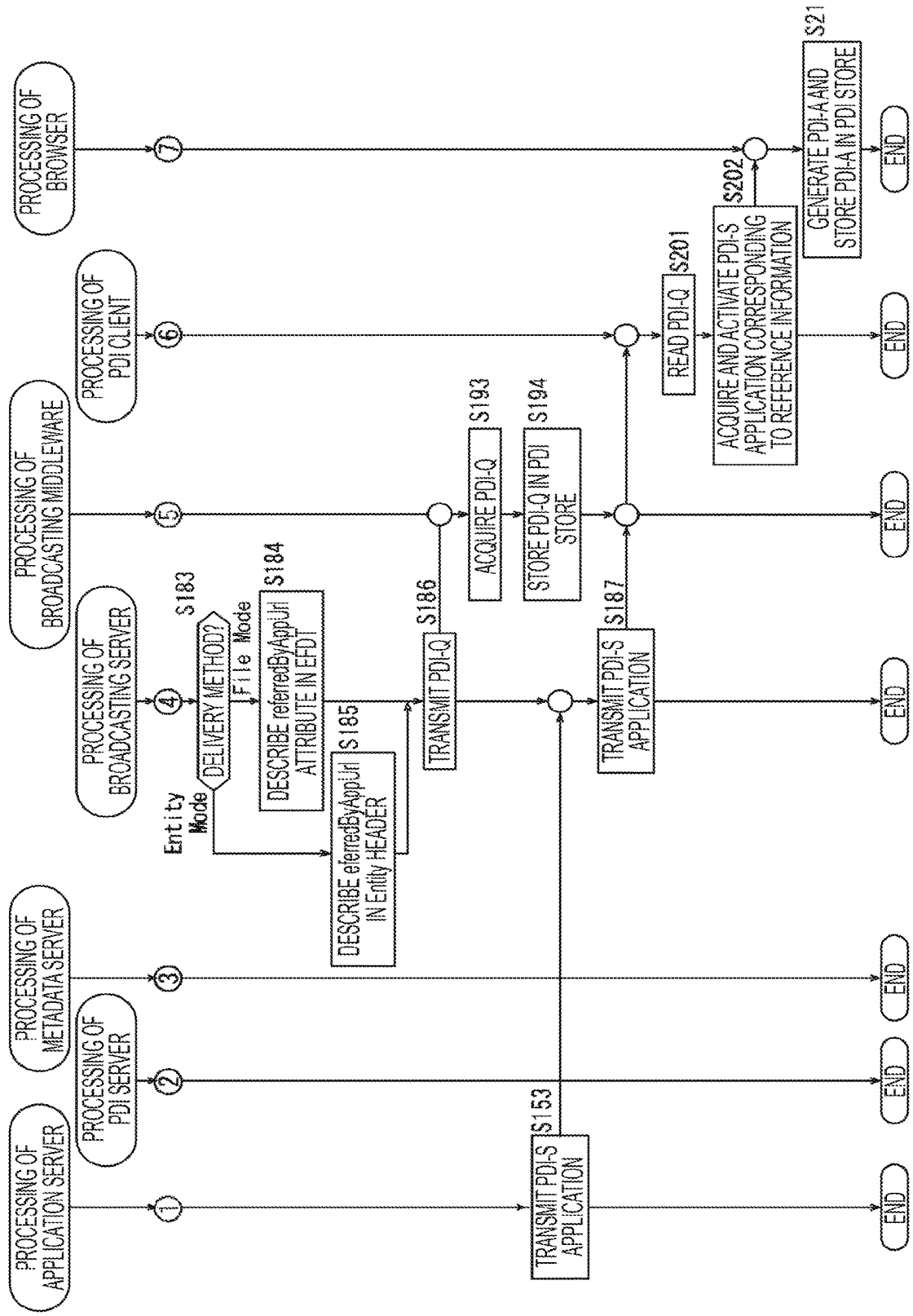
FIG. 29 is a flowchart for describing the flow of PDI correspondence processing executed by each of a transmission side apparatus and a reception side apparatus in the case of first PDI processing method (pattern 2).

In addition, in FIGS. 28 and 29, the processes of steps S151 to S153, S161 and S162, S171 to S174, and S181 to S187 are executed by the application server 105, the PDI server 102, the metadata server 104, and the broadcast server 106 of the transmission side system 10, respectively.

On the other hand, the processes of steps S191 to 194, S201 and S202, and S211 are executed by the broadcast middleware 205, the PDI client 241 (of the native module 221), and the browser 209 of the client apparatus 20.

In steps S171, S172, and S181, similarly to steps S111, S112, and S121 of FIG. 26, ESG information is processed and transmitted. Here, in a case where the PDI-Q is scheduled to be delivered from the transmission side system 10, it is possible to notify in advance that the target service to be delivered is the PDI delivery service by describing "PDI delivery service" as the ServiceType element (delivery information) of the ESG information.

In steps S173, S174, and S182, similarly to steps S113, S114, and S122 of FIG. 26, SLT metadata is processed and transmitted. Here, in a case where the PDI-Q is delivered from the transmission side system 10, it is possible to notify that the service delivered in the target ROUTE session is the PDI delivery service by describing "PDI delivery service" as the ServiceCategory attribute (delivery information) of the SLT metadata.

In step S161, the PDI-Q generator 121 generates a PDI-Q. The PDI-Q generated by the processing of step S161 is transmitted to the application server 105 (S162).

In step S151, the application server 105 generates a PDI-S application on the basis of the PDI-Q from the PDI server 102. In addition, in step S152, the application server 105 notifies the broadcast server 106 of the target PDI-Q.

In step S183, the delivery processing unit 162 determines a PDI-Q delivery method. In a case where it is determined that the delivery method is a file mode delivery (FileMode) in step S183, the process proceeds to step S184.

In step S184, the delivery processing unit 162 describes the referredByAppUrl attribute as reference information in the EFDT. As the value of the referredByAppUrl attribute, a URL (pdi-sAppUrl) indicating the reference destination of the PDI-S application is described.

On the other hand, in a case where it is determined that the delivery method is an entity delivery (Entity Mode) in step S183, the process proceeds to step S185.

In step S185, the delivery processing unit 162 describes the referredByAppUrl as reference information in the HTTP header (Entity header). As the value of the referredByAppUrl, a URL (pdi-sAppUrl) indicating the reference destination of the PDI-S application is described.

When the processing of step S184 or S185 ends, the process proceeds to step S186. In step S186, the transmission unit 161 transmits the PDI-Q from the application server 105 according to the delivery method of file mode delivery or entity delivery.

On the other hand, in step S191, similarly to step S131 of FIG. 26, ESG information is processed and presented as necessary. In addition, in a case where the PDI-Q is scheduled to be delivered, since "PDI delivery service" is described as the ServiceType element of the ESG information, it is possible to recognize that the target service to be delivered is the PDI delivery service.

In step S192, similarly to step S132 of FIG. 26, SLT metadata is processed. Here, in a case where the PDI-Q is delivered, since "PDI delivery service" is described as the ServiceCategory attribute of the SLT metadata, the broadcast middleware 205 specifies the ROUTE session, in which the PDI delivery service is delivered, according to the parsing result of the SLT metadata and acquires the PDI-Q (S193).

Then, in step S194, similarly to step S134 of FIG. 26, the PDI-Q acquired from the ROUTE session is stored in the PDI store 261. In addition, storage, updating, or deletion of the PDI-Q is also similarly performed herein.

Here, in the case of the PDI correspondence processing of the pattern 2, the PDI-S application generated by the application server 105 is transmitted to the broadcast server 106 (S153). Then, in step S187, the transmission unit 161 transmits the PDI-S application from the application server 105.

On the other hand, in step S201, the PDI client 241 reads the PDI-Q stored in the PDI store 261. In addition, in step S202, the PDI client 241 acquires and activates the PDI-S application corresponding to the reference information (PDI-S Ref).

That is, the URL (pdi-sAppUrl) indicating the acquisition destination of the PDI-S application as reference information is designated by the referredByAppUrl attribute of the EFDT in a case where the delivery method is a file mode delivery, and is designated by referredByAppUrl of the HTTP header in a case where the delivery method is an entity delivery. By using the reference information (URL), it is possible to acquire the PDI-S application that is broadcast-delivered.

In addition, although the example in which the PDI-S application is broadcast-delivered by the ROUTE session has been described herein, the PDI-S application may be communication-delivered from the communication server 107. In this case, the client apparatus 20 accesses the communication server 107 through the Internet 50 according to the reference information (URL) and acquires the PDI-S application.

The PDI-S application acquired through broadcasting or communication as described above is activated on the browser 209, and the PDI-A (client side PDI-A) is generated according to the PDI-Q read from the PDI store 261 and stored in the PDI store 261 (S211).

Here, similarly to step S142 of FIG. 26, by displaying an answer to the question defined in the PDI-Q on the display and receiving the input or selection of the end user's answer to the question, the PDI-A corresponding to the input or selection result of the answer is generated and stored in the PDI store 261. The PDI delivery service screen (FIG. 27) can also be similarly displayed herein.

In addition, as described above, in the processing of step S211, the PDI-A may be generated by analogizing the preferences of the end user with reference to the viewing history information of the end user or the like.

The flow of the PDI correspondence processing of the pattern 2 has been described above.

(2) Second PDI Processing Method

The second PDI processing method is a method of delivering the PDI-Q as a sub-resource together with the PDI-S application. In the second PDI processing method, the PDI-S application generates a PDI-A and stores the PDI-A in the PDI store 261.

That is, in the second PDI processing method, in a case where the PDI-Q instance is generated or the PDI-Q instance once delivered is updated on the transmission side system 10 side, the generated or updated PDI-Q (PDI-Q instance) is delivered as a sub-resource of the PDI-S application. Then, in the client apparatus 20, the PDI-S application can parse the PDI-Q as a sub-resource and generate a corresponding PDI-A.

Therefore, it is possible to accurately and reliably generate the corresponding PDI-A on the client apparatus 20 side on the basis of the accurate intention of the broadcasting station side and to reduce the burden of the PDI correspondence processing on the client apparatus 20 side.

(Overall Image of the Second PDI Processing Method)

Figure 30:
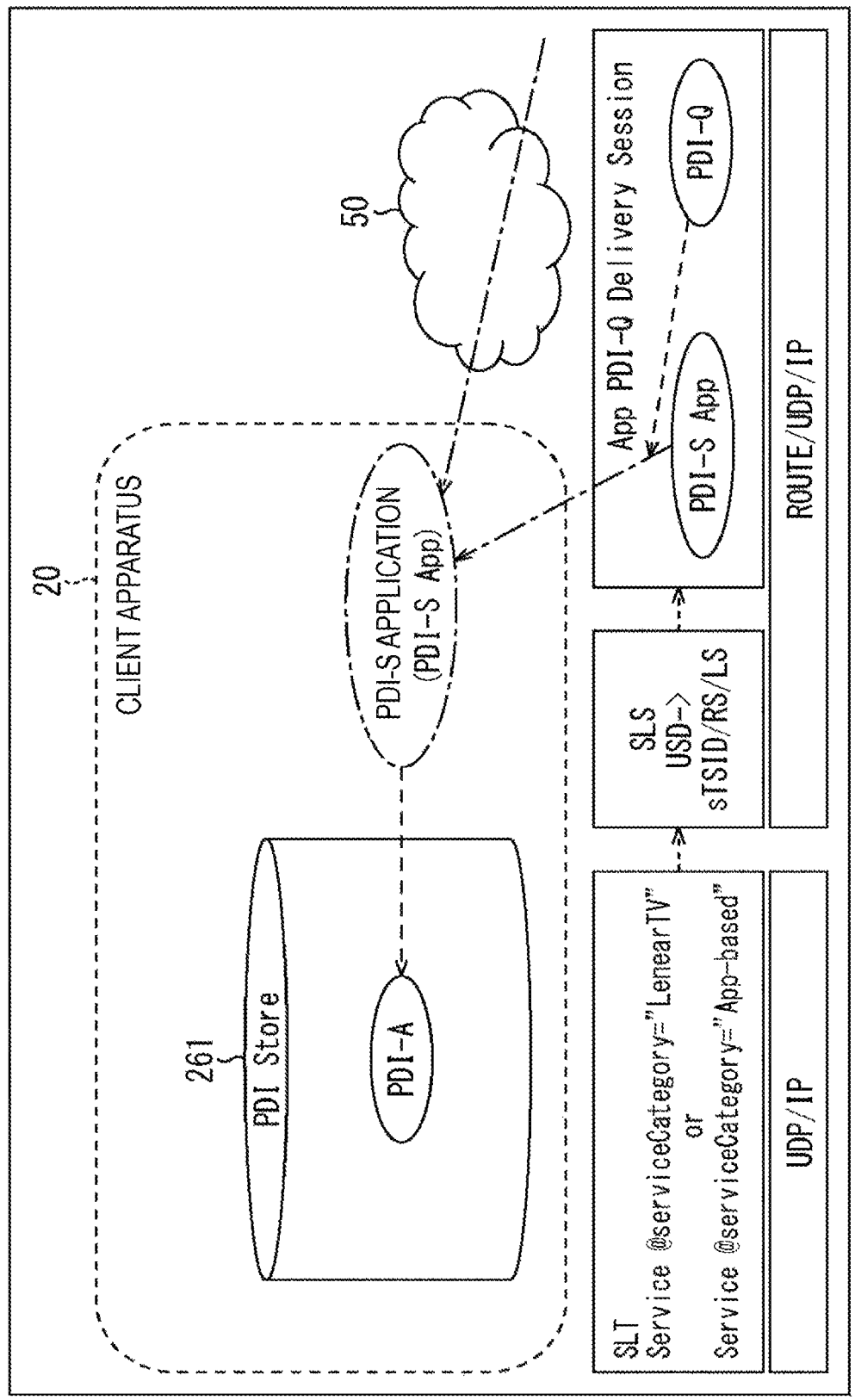
FIG. 30 is a diagram illustrating an overall image of a second PDI processing method.

FIG. 30 is a diagram illustrating an overall image of the second PDI processing method.

As illustrated in FIG. 30, in the ROUTE session of the App •PDI-Q delivery service in which serviceCategory="Linear TV" or "App-based" is designated as the serviceCategory attribute of the Service element of the SLT metadata, the PDI-S application and the file of the PDI-Q as the sub-resource are transmitted.

Here, in the client apparatus 20, the application manager 222 acquires the PDI-S application, which is delivered in the ROUTE session of the App •PDI-Q delivery service, through the broadcast middleware 205, and activates the acquired PDI-S application on the browser 209. In addition, here, in addition to the PDI-S application that is broadcast-delivered, a PDI-S application that is communication-delivered through the Internet 50 may be acquired.

In addition, the PDI-Q delivered in the same ROUTE session is referred to and processed in the PDI-S application activated on the browser 209.

Then, on the basis of the PDI-Q as a sub-resource, the PDI-S application performs necessary interaction with the end user, for example, through the interactive screen illustrated in FIG. 12 or the like, so that a corresponding PDI-A (client side PDI-A) is generated. The generated PDI-A (client side PDI-A) is stored in the PDI store 261.

(Details of PDI-S Application and PDI-Q Delivery)

Figure 31:
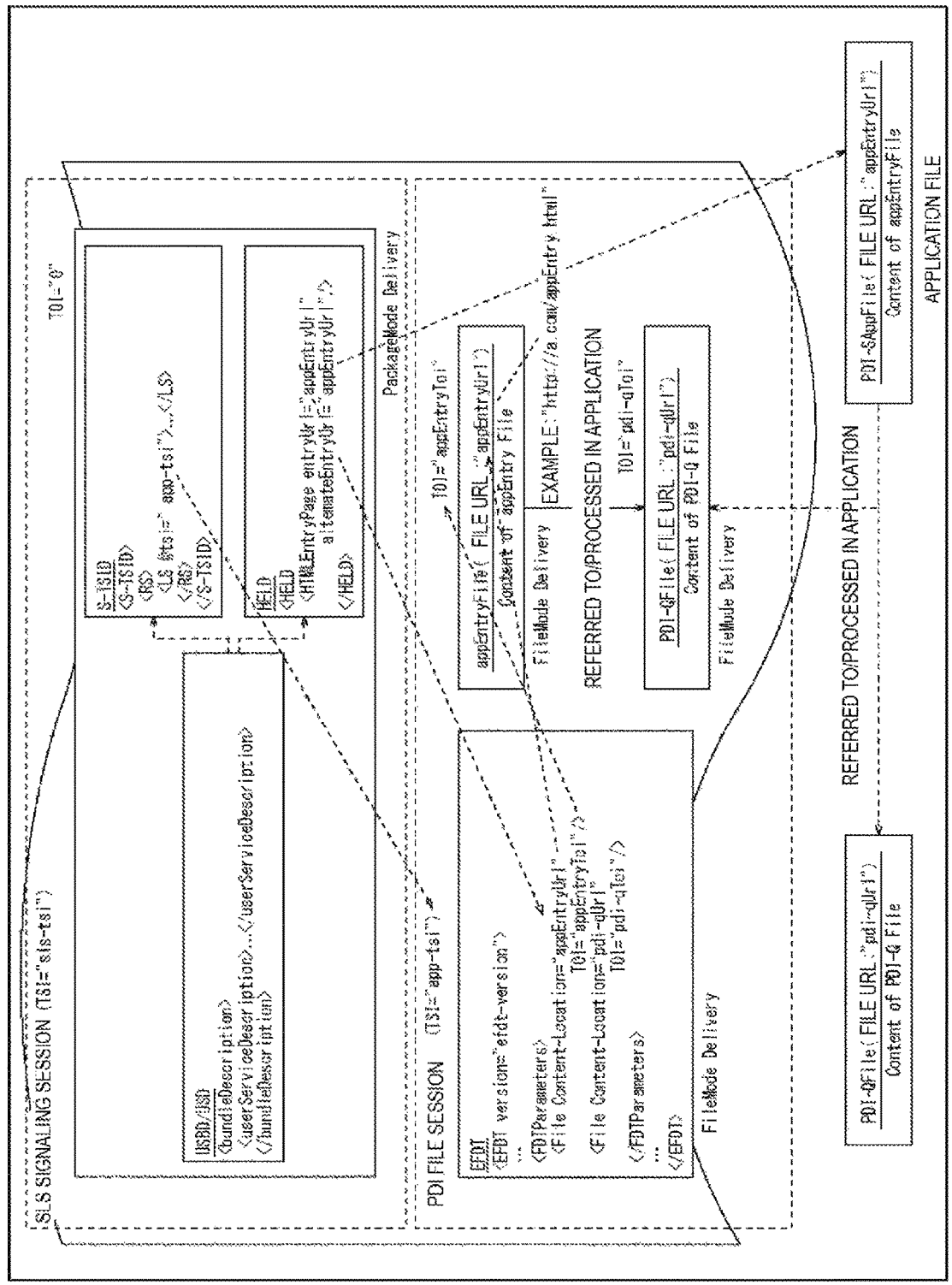
FIG. 31 is a diagram illustrating the details of PDI-S application and PDI-Q delivery.

FIG. 31 is a diagram illustrating the details of PDI-S application and PDI-Q delivery.

FIG. 31 illustrates a relationship among the SLS carried in the SLS signaling session, the PDI-Q carried in the PDI file session, and the PDI-S application that is broadcast-delivered or communication-delivered.

In addition, the SLS signaling session (TSI="sls-tsi") is delivered in the package mode, and the PDI file session (TSI="app-tsi") is delivered in the file mode.

In the SLS signaling session, a USD fragment (USBD metadata), an S-TSID fragment (S-TSID metadata), and a HELD fragment (HELD metadata) that are identified by specific TOI (TOI="0") are transmitted. By acquiring the USD fragment, it is possible to refer to the S-TSID fragment and the HELD fragment.

In the S-TSID fragment, tsi="app-tsi" is designated as the value of the tsi attribute of the LS element, but the PDI file session is referred to by the value of the tsi attribute. In the PDI file session, the EFDT, the file of the PDI-Q, and the file of the PDI-S application are transmitted.

Here, in the case of acquiring (activating) the PDI-S application that is broadcast-delivered, for example, the following processing is performed.

That is, the client apparatus 20 can acquire the file of the PDI-S application transmitted in the PDI file session by specifying TOI (appEntryToi) by performing matching processing between the value (appEntryUrl) of the HTMLEntryPageEntryUrl element of the HELD fragment and the value (appEntryUrl) of the Content-Location attribute of the File element of the FDTParameters element of the EFDT.

Then, in the client apparatus 20, the broadcast-delivered PDI-S application is activated, and the file (sub-resource) of the PDI-Q transmitted in the same PDI file session is referred to and processed in the PDI-S application.

On the other hand, in the case of acquiring (activating) the PDI-S application that is communication-delivered, for example, the following processing is performed.

That is, the client apparatus 20 can acquire the file of the PDI-S application delivered from the communication server 107 through the Internet 50 on the basis of the value (appEntryUrl) of the alternateEntryUrl element of the HELD fragment.

Then, in the client apparatus 20, the communication-delivered PDI-S application is activated and transmitted in the PDI file session within the PDI-S application, or the file (sub-resource) of the PDI-Q delivered from the communication server 107 through the Internet 50 is referred to and processed on the basis of the URL (pdi-gUrl) described in the PDI-S application.

(Flow of PDI Correspondence Processing)

Next, with reference to the flowchart illustrated in FIG. 32, the flow of PDI correspondence processing executed by each of the transmission side apparatus and the reception side apparatus in the case of the second PDI processing method will be described.

Figure 32:
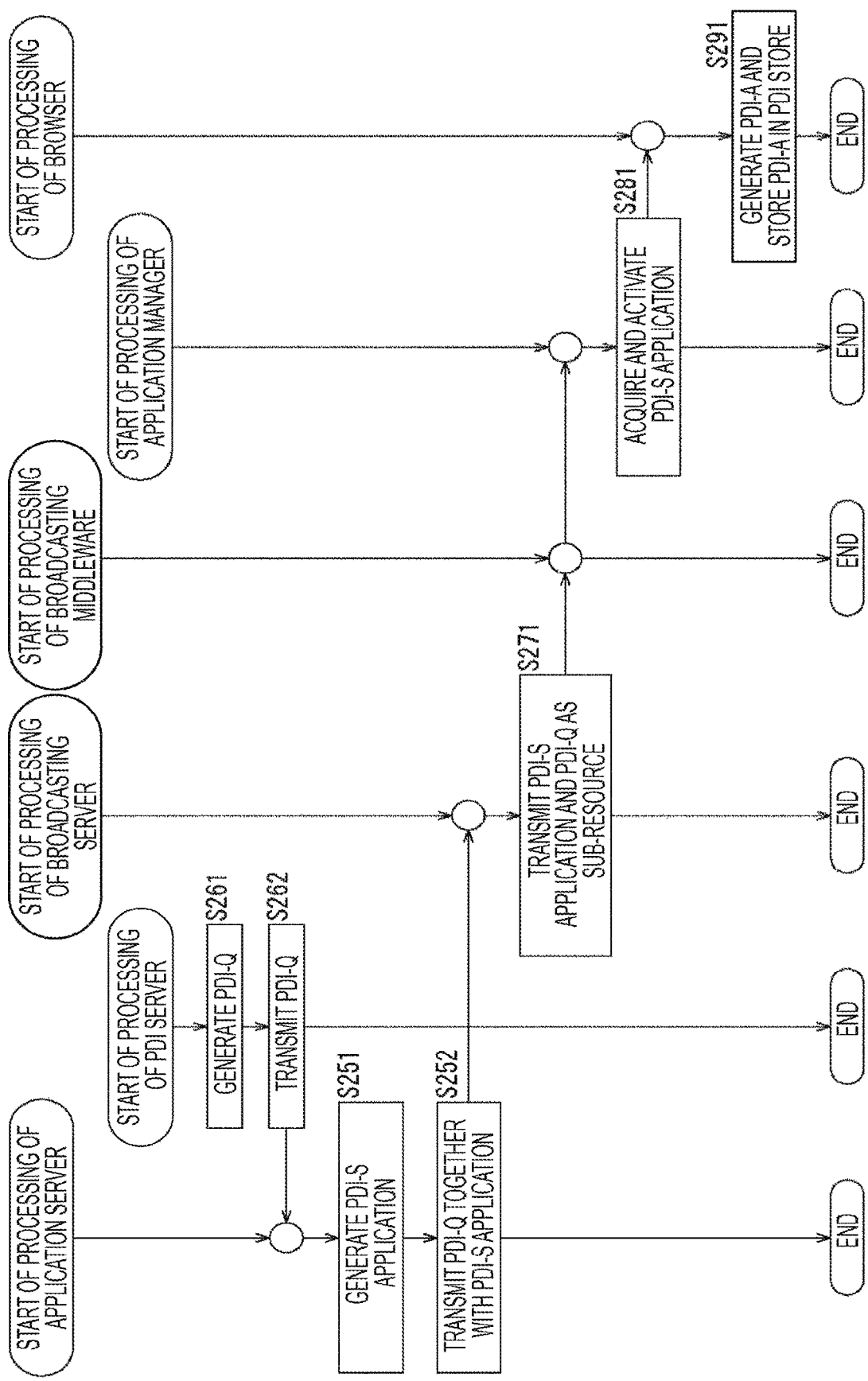
FIG. 32 describes the flow of PDI correspondence processing executed by each of a transmission side apparatus and a reception side apparatus in the case of second PDI processing method.

In addition, in FIG. 32, the processes of steps S251 and S252, S261 and S262, and S271 are executed by the application server 105, the PDI server 102, and the broadcast server 106 of the transmission side system 10, respectively.

On the other hand, the processes of steps S281 and S291 are executed by the application manager 222 and browser 209 of the client apparatus 20.

In step S261, the PDI-Q generator 121 generates a PDI-Q. The PDI-Q generated by the processing of step S261 is transmitted to the application server 105 (S262).

In step S251, the application server 105 generates a PDI-S application on the basis of the PDI-Q from the PDI server 102. In addition, in step S252, the application server 105 transmits a target PDI-Q (sub-resource) to the broadcast server 106 together with the PDI-S application.

In step S271, the transmission unit 161 transmits the PDI-S application and the PDI-Q as a sub-resource from the application server 105.

On the other hand, in step S281, the application manager 222 acquires and activates the PDI-S application delivered in the ROUTE session through the broadcast middleware 205. The PDI-S application is activated on the browser 209 to generate the PDI-A (client side PDI-A) according to the PDI-Q as a sub-resource and store the PDI-A (client side PDI-A) in the PDI store 261 (S291).

Here, on the basis of the PDI-Q, the PDI-S application executed on the browser 209 performs necessary interaction with the end user, for example, through the interactive screen illustrated in FIG. 12 or the like, so that it is possible to generate a corresponding PDI-A (client side PDI-A).

The flow of the PDI correspondence processing has been described above.

Note that, as a variation of the second PDI processing method, there is a case where the PDI-A is generated on the client apparatus 20 side by delivering only an application including a PDI-S function without generating the file itself of the PDI-Q instance. In addition, as the application, for example, an application in which the content of the PDI-Q is hard-coded, an application integrated in application logic, and the like are assumed.

(3) Content Filtering Processing Using PDI (Flow of Content Filtering Processing)

Figure 33:
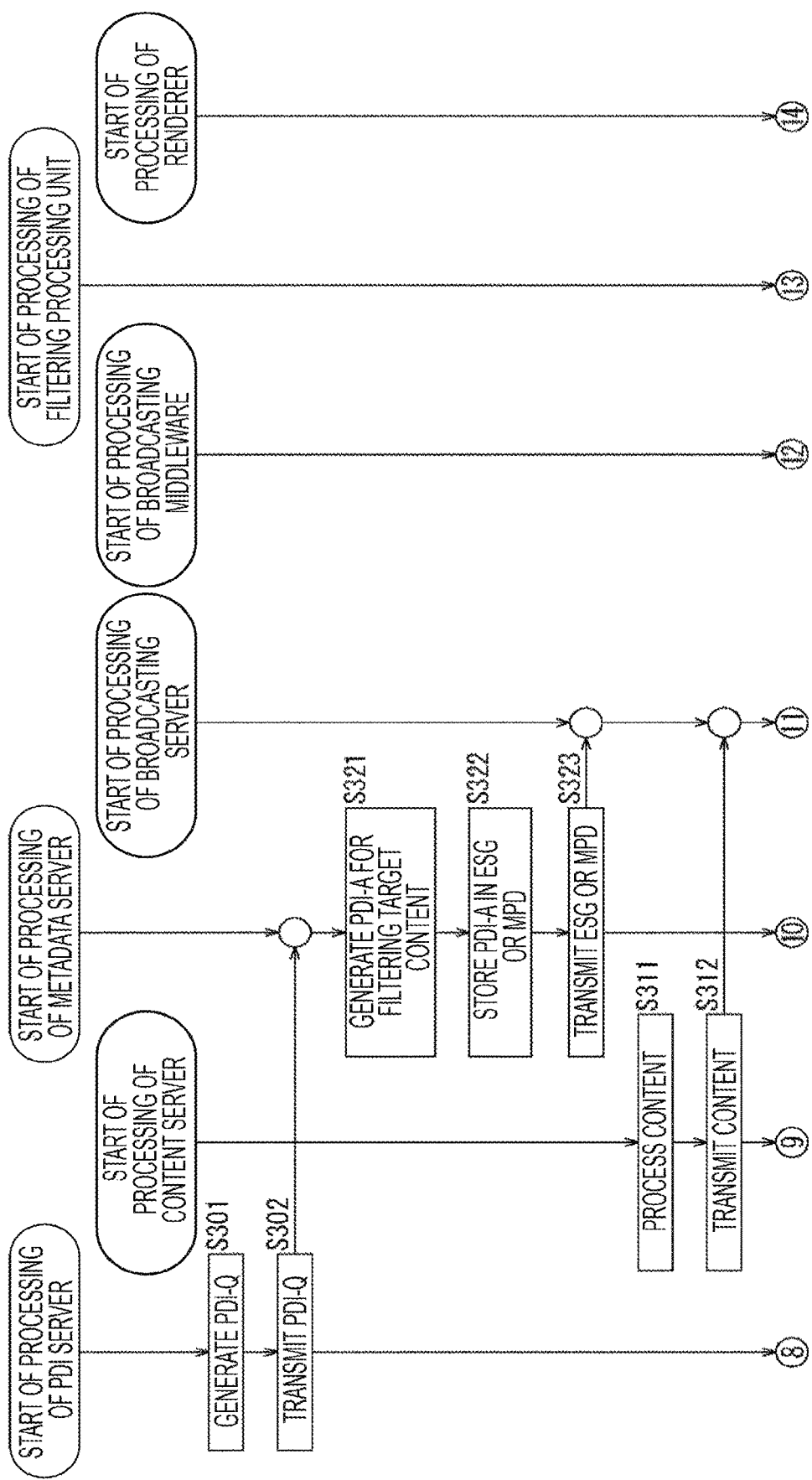
FIG. 33 is a flowchart for describing the flow of content filtering processing using the PDI.
Figure 34:
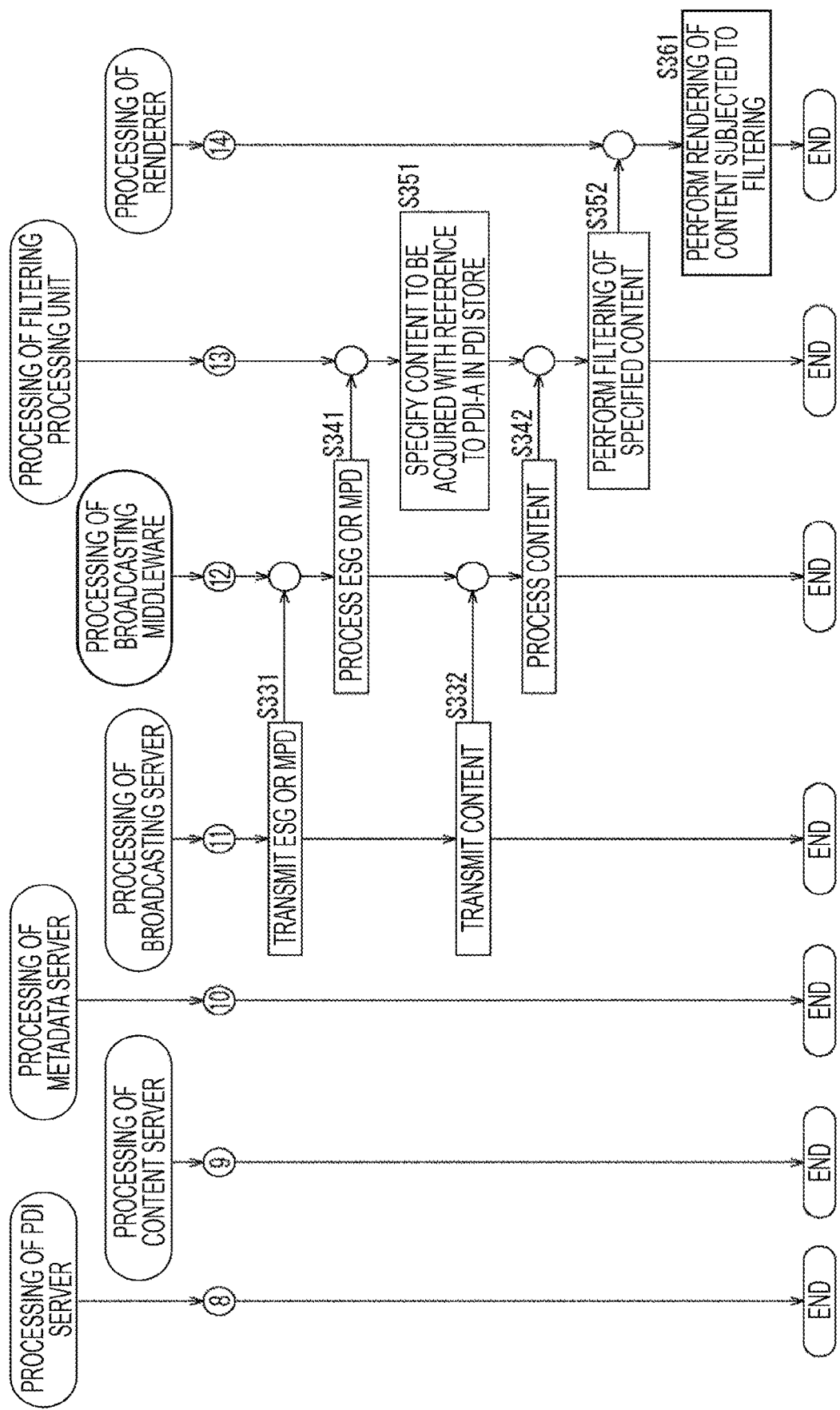
FIG. 34 is a flowchart for describing the flow of content filtering processing using the PDI.

Next, content filtering processing using the above-described PDI will be described. FIGS. 33 and 34 are flowcharts for describing the flow of content filtering processing using the PDI.

In addition, in FIGS. 33 and 34, the processes of steps S301 and S302, S311 and S312, S321 to S323, and S331 and S332 are executed by the PDI server 102, the content server 101, the metadata server 104, and the broadcast server 106 of the transmission side system 10, respectively.

On the other hand, the processes of steps S341 and S342, S351 and S352, and S361 are executed by the broadcast middleware 205, the filtering processing unit 223, and the renderer 207 of the client apparatus 20.

In addition, it is assumed that, in advance of the content filtering processing, the client apparatus 20 executes the PDI correspondence processing (FIG. 26) of the first PDI processing method (pattern 1), the PDI correspondence processing (FIGS. 28 and 29) of the first PDI processing method (pattern 2), or the PDI correspondence processing (FIG. 32) of the second PDI processing method, which has been described above, and stores the PDI-A (client side PDI-A) in the PDI store 261.

In step S301, the PDI-Q generator 121 generates a PDI-Q. The PDI-Q generated herein is transmitted to the metadata server 104 (S302).

In step S321, the PDI-A generator 143 generates a PDI-A (provider side PDI-A) for filtering the target content on the basis of the PDI-Q from the PDI server 102.

Here, for example, in a case where the PDI-Q is generated in response to an operation of a staff (provider of content) of a provider, such as a broadcasting station, an answer to the question defined in the PDI-Q is displayed on the display (for example, the interactive screen illustrated in FIG. 12) and the staff of the provider inputs or selects an answer to the question, so that the PDI-A (provider side PDI-A) indicating the answer is generated.

In step S322, the ESG processing unit 141 stores the PDI-A (provider side PDI-A) in the ESG information. In addition, the metadata processing unit 142 stores the PDI-A (provider side PDI-A) in the MPD metadata.

In addition, the PDI-A (provider side PDI-A) may be stored in at least one of the ESG information or the MPD metadata. The ESG information or the MPD metadata generated herein is transmitted to the broadcast server 106 (S323).

In step S311, the content server 101 processes the content to be delivered. Stream data (DASH segment) obtained by this processing is transmitted to the broadcast server 106 (S312).

In step S331, the transmission unit 161 transmits the ESG information or the MPD metadata from the metadata server 104. In addition, in step S332, the transmission unit 161 transmits the stream data of the content from the content server 101.

On the other hand, in step S341, the broadcast middleware 205 processes the ESG information or the MPD metadata obtained from the broadcast signal received by the tuner 204. Here, since the PDI-A (provider side PDI-A) is included in the ESG information or the MPD metadata, the filtering processing unit 223 is notified of the parsing result of the provider side PDI-A.

In step S351, the filtering processing unit 223 specifies the content to be acquired by performing processing of matching with the PDI-A (provider side PDI-A), which is included in the ESG information or the MPD metadata, with reference to the PDI-A (client side PDI-A) stored in the PDI store 261.

In addition, in step S342, the broadcast middleware 205 processes the stream data of the content obtained from the broadcast signal.

In step S352, the filtering processing unit 223 performs filtering of the specific content to acquire the stream data of the content corresponding to the matching processing result.

Figure 35:
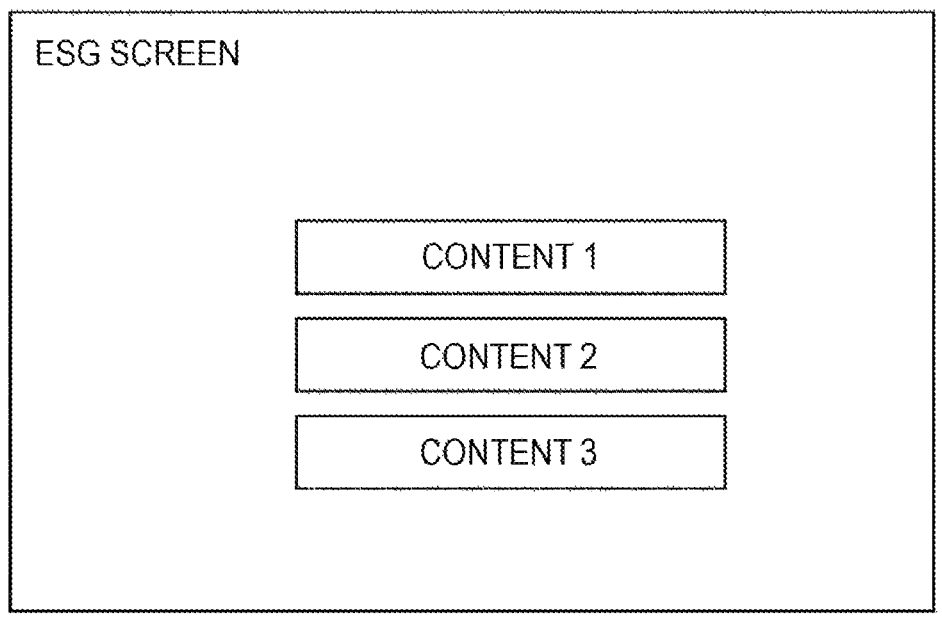
FIG. 35 is a diagram illustrating a display example of a PDI delivery service screen.

Here, as illustrated in the example of the ESG screen in FIG. 35, a list of content can be displayed in descending order of the matching degree of PDI-A according to the matching processing result. In the example of the ESG screen in FIG. 35, the matching degree of PDI-A is high in the order of content 1, content 2, and content 3.

By presenting such an ESG screen, the end user can preferentially select content with a high matching degree of PDI-A.

In addition, the ESG screen illustrated in FIG. 35 is an example of a screen for presenting the filtering processing result, and may be displayed in other display forms.

Referring back to FIG. 34, in step S361, the renderer 207 performs rendering of the stream data of the content obtained as a result of filtering.

Here, for example, in a case where the content 1 is selected by the end user from the list on the ESG screen in FIG. 35, rendering of the stream data of the content 1 is performed, and the image and sound of the content 1 are reproduced (or recorded). With this arrangement, the content according to the preferences of the end user is reproduced (or recorded).

The flow of the content filtering processing has been described above.

4. Modification Example (Application to Other Broadcasting Standards)

In the above description, ATSC (in particular, ATSC3.0) that is a method adopted in the United States and the like has been described as digital broadcasting standards. However, the present technology may also be applied to integrated services digital broadcasting (ISDB) that is a method adopted in Japan and the like, digital video broadcasting (DVB) that is a method adopted in each country in Europe and the like, for example.

In addition, in the above description, the ATSC3.0 adopting the IP transmission method has been described as an example. However, the present technology is not limited to the IP transmission method and may be applied to other methods, such as an MPEG 2-TS (Transport Stream) method, for example.

In addition, the digital broadcasting standards can be applied as standards for not only terrestrial broadcasting but also satellite broadcasting using a broadcasting satellite (BS), a communications satellite (CS), and the like, cable broadcasting such as cable television (common antenna television: CATV), and the like.

Other Modification Examples

The names such as control information (signaling) described above are examples, and other names may be used. However, the difference between these names is a formal difference, and the substantial content of target control information and the like are not different.

For example, user service bundle description (USBD) may be referred to as user service description (USD). In addition, for example, non real time (NRT) may be referred to as locally cached content (LCC), electronic service guide (ESG) may be referred to as electronic program guide (EPG). In addition, for example, HTTP entry location description (HELD) may be referred to as application signaling table (AST), application information table (AIT), and the like.

In addition, as an application, in addition to an application developed in a markup language such as HTML5 or a script language such as JavaScript (registered trademark), for example, an application developed in a programming language such as Java (registered trademark) may be used.

In addition, not only does an application explicitly display some information, but also the application may be operated in a non-display manner (in the background) (may be activated without being recognized by the end user). In addition, the content can include not only a moving image or music but also any content, such as a digital book, a game, and an advertisement, for example.

5. Configuration of a Computer

Figure 36:
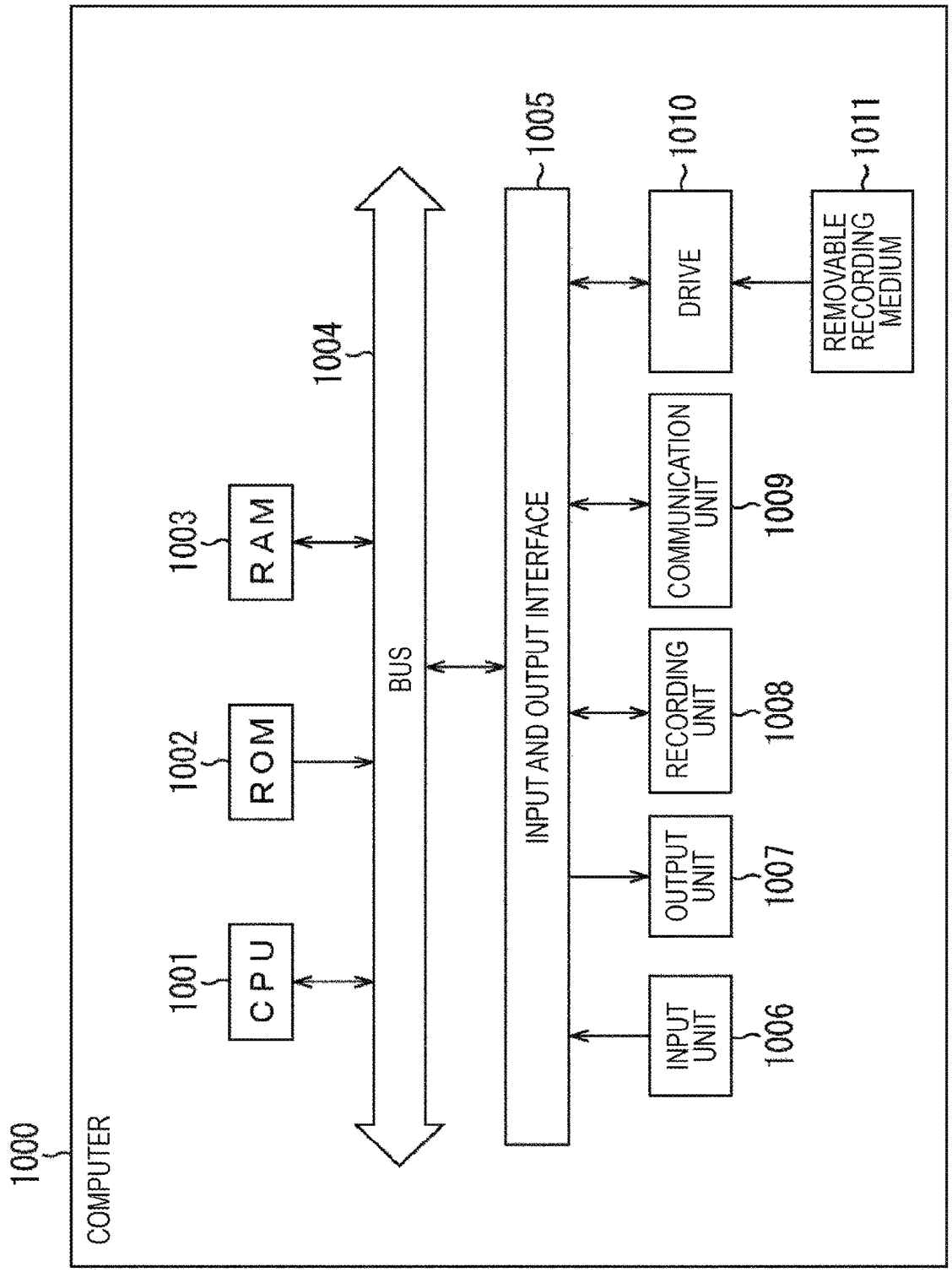
FIG. 36 is a diagram illustrating a configuration example of a computer.

A series of processes described above can be executed by hardware or can be executed by software. In the case of executing the series of processes by software, a program of the software is installed on a computer. FIG. 36 is a diagram illustrating a configuration example of hardware of a computer that executes the above-described series of processes using a program.

In a computer 1000, a central processing unit (CPU) 1001, a read only memory (ROM) 1002, and a random access memory (RAM) 1003 are connected to each other by a bus 1004. An input and output interface 1005 is further connected to the bus 1004. An input unit 1006, an output unit 1007, a recording unit 1008, a communication unit 1009, and a drive 1010 are connected to the input and output interface 1005.

The input unit 1006 includes a keyboard, a mouse, a microphone, and the like. The output unit 1007 includes a display, a speaker, and the like. The recording unit 1008 includes a hard disk, a nonvolatile memory, and the like. The communication unit 1009 includes a network interface and the like. The drive 1010 drives a removable recording medium 1011, such as a magnetic disk, an optical disk, a magneto-optical disk, or a semiconductor memory.

In the computer 1000 formed as described above, the CPU 1001 loads a program recorded in the ROM 1002 or the recording unit 1008 to the RAM 1003 through the input and output interface 1005 and the bus 1004 and executes the program, so that the above-described series of processes is performed.

The program executed by the computer 1000 (CPU 1001) can be provided in a state in which the program is recorded on the removable recording medium 1011 as a package medium or the like, for example. In addition, the program can be provided through a wired or wireless transmission medium, such as a local area network, the Internet, and digital satellite broadcasting.

In the computer 1000, the program can be installed on the recording unit 1008 through the input and output interface 1005 by mounting the removable recording medium 1011 on the drive 1010. In addition, the program can be received by the communication unit 1009 through a wired or wireless transmission medium and installed on the recording unit 1008. In addition, the program can be installed on the ROM 1002 or the recording unit 1008 in advance.

Here, in this specification, the processing performed by the computer according to the program does not necessarily need to be performed in time series in accordance with the order described as the flowchart. That is, the processing performed by the computer according to the program also includes processing that is executed in parallel or individually (for example, parallel processing or processing by an object). In addition, the program may be processed by one computer (processor), or may be processed in a distributed manner by a plurality of computers.

In addition, embodiments of the present technology are not limited to the embodiment described above, and various modifications can be made without departing from the gist of the present technology.

In addition, the present technology can adopt the following configuration.

(1) A reception apparatus including: a reception unit that receives content; and a processing unit that processes question information, which indicates a question about preferences of an end user and is delivered together with the content, on the basis of at least one of delivery information indicating that a service for providing dynamic metadata expressing the preferences of the end user is delivered or reference information indicating a reference destination of an application for generating first answer information indicating an answer set by the end user for the question about the preferences of the end user.

(2) The reception apparatus described in the above (1), in which the processing unit generates the first answer information, performs matching processing between the first answer information and second answer information indicating an answer set by a provider who provides the content with respect to the question, and performs filtering processing of the content according to a result of the matching processing.

(3) The reception apparatus described in the above (2), in which the processing unit specifies the service on the basis of the delivery information.

(4) The reception apparatus described in the above (3), in which the delivery information is included in control information delivered together with the content and the processing unit acquires the question information delivered by the service on the basis of the delivery information included in the control information.

(5) The reception apparatus described in the above (3), in which the delivery information is included in program information delivered in advance for the content and the processing unit provides notification of delivery of the service in advance on the basis of the delivery information included in the program information.

(6) The reception apparatus described in any one of the above (2) to (5), in which the processing unit generates the first answer information by acquiring and activating the application on the basis of the reference information.

(7) The reception apparatus described in the above (6), in which the reference information is included in control information of a session for delivering the service and the processing unit acquires the application on the basis of the reference information included in the control information.

(8) The reception apparatus described in the above (6), in which the reference information is included in a header of a file of the question information delivered in a session for delivering the service and the processing unit acquires the application on the basis of the reference information included in the header.

(9) The reception apparatus described in any one of the above (1) to (8), in which the content is broadcast-delivered by digital broadcasting using an Internet protocol (IP) transmission method.

(10) A data processing method of a reception apparatus including: a step in which the reception apparatus receives content; and a step in which the reception apparatus processes question information, which indicates a question about preferences of an end user and is delivered together with the content, on the basis of at least one of delivery information indicating that a service for providing dynamic metadata expressing the preferences of the end user is delivered or reference information indicating a reference destination of an application for generating first answer information indicating an answer set by the end user for the question about the preferences of the end user.

(11) A transmission apparatus including: a generation unit that generates at least one of delivery information indicating that a service for providing dynamic metadata expressing preferences of an end user is delivered or reference information indicating a reference destination of an application for generating first answer information indicating an answer set by the end user for a question about the preferences of the end user; and a transmission unit that transmits question information indicating the question and at least one of the delivery information or the reference information together with content.

(12) The transmission apparatus described in the above (11), in which the generation unit generates second answer information indicating an answer set by a provider who provides content for the question, the second answer information being used for processing of matching with the first answer information and the transmission unit transmits the second answer information.

(13) The transmission apparatus described in the above (12), in which the delivery information is included in control information delivered together with the content.

(14) The transmission apparatus described in the above (12), in which the delivery information is included in program information delivered in advance for the content.

(15) The transmission apparatus described in any one of the above (12) to (14), in which the reference information is included in control information of a session for delivering the service.

(16) The transmission apparatus described in any one of the above (12) to (14), in which the reference information is included in a header of a file of the question information delivered in a session for delivering the service.

(17) The transmission apparatus described in any one of the above (12) to (16), in which the second answer information is included in control information delivered together with the content.

(18) The transmission apparatus described in any one of the above (12) to (16), in which the second answer information is included in program information delivered in advance for the content.

(19) The transmission apparatus described in any one of the above (11) to (18), in which the content is broadcast-delivered by digital broadcasting using an IP transmission method.

(20) A data processing method of a transmission apparatus including: a step in which the transmission apparatus generates at least one of delivery information indicating that a service for providing dynamic metadata expressing preferences of an end user is delivered or reference information indicating a reference destination of an application for generating first answer information indicating an answer set by the end user for a question about the preferences of the end user; and a step in which the transmission apparatus transmits question information indicating the question and at least one of the delivery information or the reference information together with content.

REFERENCE SIGNS LIST

1 Transmission system
10 Transmission side system
20 Client apparatus
30 Transmission station
40 Transmission path
50 Internet
101 Content server
102 PDI server
103 ESG server
104 Metadata server
105 Application server
106 Broadcast server
107 Communication server
121 PDI-Q generator
141 ESG processing unit
142 Metadata processing unit
143 PDI-A generator
161 Transmission unit
162 Delivery processing unit
201 Processing unit
202 Input unit 203 Storage unit
204 Tuner
205 Broadcast middleware
206 DASH client
207 Renderer
208 Output unit
209 Browser
210 Communication I/F
221 Native module
222 Application manager
223 Filtering processing unit
241 PDI client
261 PDI store
1000 Computer
1001 CPU

The invention claimed is:

1. A reception apparatus, comprising:
a tuner configured to receive a broadcast signal including content; and
processing circuitry configured to:
acquire metadata from the broadcast signal, the metadata including location information used to acquire an application,
control the application acquired using the location information included in the metadata to process question information, the question information indicating a question about a preference of a user, and
generate, based on the application, first answer information indicating an answer set by the user for the question about the preference of the user.

2. The reception apparatus according to claim 1, wherein the processing circuitry is configured to
perform matching processing between the first answer information and second answer information indicating an answer set by a provider with respect to the question, the provider providing the content, and
perform filtering processing of the content according to a result of the matching processing.

3. The reception apparatus according to claim 2, wherein the processing circuitry is configured to
acquire delivery information, the delivery information indicating that a service for providing dynamic metadata expressing the preference of the user is delivered, and
specify the service based on the delivery information.

4. The reception apparatus according to claim 3, wherein the delivery information is included in control information delivered with the content, and
the processing circuitry is configured to acquire the question information delivered by the service based on the delivery information included in the control information.

5. The reception apparatus according to claim 3, wherein the delivery information is included in program information delivered in advance for the content, and
the processing circuitry is configured to provide notification of delivery of the service in advance based on the delivery information included in the program information.

6. The reception apparatus according to claim 1, wherein the processing circuitry is configured to acquire the application from the broadcast signal.

7. The reception apparatus according to claim 3, wherein the location information is included in control information of a session for delivering the service.

8. The reception apparatus according to claim 3, wherein the location information is included in a header of a file of the question information delivered in a session for delivering the service.

9. The reception apparatus according to claim 1, wherein the broadcast signal is delivered using an Internet protocol (IP) transmission method.

10. A data processing method of a reception apparatus, comprising:
receiving, by a tuner, a broadcast signal including content;
acquiring, by processing circuitry, metadata from the broadcast signal, the metadata including location information used to acquire an application;
controlling, by the processing circuitry, the application acquired using the location information included in the metadata to process question information, the question information indicating a question about a preference of a user; and
generating, based on the application and by the processing circuitry, first answer information indicating an answer set by the user for the question about the preference of the user.

11. A transmission apparatus, comprising:
processing circuitry configured to generate metadata including location information used by a reception apparatus to acquire an application, the application acquired using the location information included in the metadata being configured to process question information and generate first answer information, the question information indicating a question about a preference of a user, and the first answer information indicating an answer set by the user for the question about the preference of the user; and
a transmitter configured to transmit a broadcast signal including content, the metadata, and the question information.

12. The transmission apparatus according to claim 11, wherein
the processing circuitry is configured to generate second answer information indicating an answer set by a provider with respect to the question, the provider providing the content, and the second answer information being used for processing of matching with the first answer information, and
the transmitter is configured to transmit the second answer information.

13. The transmission apparatus according to claim 11, wherein delivery information is included in control information delivered with the content, the delivery information indicating that a service for providing dynamic metadata expressing the preference of the user is delivered.

14. The transmission apparatus according to claim 11, wherein delivery information is included in program information delivered in advance for the content, the delivery information indicating that a service for providing dynamic metadata expressing the preference of the user is delivered.

15. The transmission apparatus according to claim 11, wherein the location information is included in control information of a session for delivering a service.

16. The transmission apparatus according to claim 11, wherein the location information is included in a header of a file of the question information delivered in a session for delivering a service.

17. The transmission apparatus according to claim 12, wherein the second answer information is included in control information delivered with the content.

18. The transmission apparatus according to claim 12, wherein the second answer information is included in program information delivered in advance for the content.

19. The transmission apparatus according to claim 11, wherein the broadcast signal is delivered using an IP transmission method.

20. A data processing method of a transmission apparatus, comprising:

generating, by processing circuitry, metadata including location information used by a reception apparatus to acquire an application, the application acquired using the location information included in the metadata being configured to process question information and generate first answer information, the question information indicating a question about a preference of a user, and the first answer information indicating an answer set by the user for the question about the preference of the user; and transmitting, by a transmitter, a broadcast signal including content, the metadata, and the question information.

* * * * *